(12) United States Patent
Lengauer et al.

(10) Patent No.: US 10,691,575 B2
(45) Date of Patent: Jun. 23, 2020

(54) METHOD AND SYSTEM FOR SELF-OPTIMIZING PATH-BASED OBJECT ALLOCATION TRACKING

(71) Applicant: Dynatrace LLC, Waltham, MA (US)

(72) Inventors: Philipp Lengauer, Steyregg (AT); Stefan Fitzek, Gallneukirchen (AT)

(73) Assignee: Dynatrace LLC, Waltham, MA (US)

( * ) Notice: Subject to any disclaimer, the term of this patent is extended or adjusted under 35 U.S.C. 154(b) by 0 days.

(21) Appl. No.: 16/149,649

(22) Filed: Oct. 2, 2018

(65) Prior Publication Data
US 2019/0196939 A1    Jun. 27, 2019

Related U.S. Application Data

(60) Provisional application No. 62/574,490, filed on Oct. 19, 2017.

(51) Int. Cl.
*G06F 9/44* (2018.01)
*G06F 11/36* (2006.01)
(Continued)

(52) U.S. Cl.
CPC ........ *G06F 11/3644* (2013.01); *G06F 9/5016* (2013.01); *G06F 11/3006* (2013.01);
(Continued)

(58) Field of Classification Search
CPC ............. G06F 11/3006; G06F 11/3466; G06F 11/3495; G06F 11/3624; G06F 11/3636; G06F 11/3644; G06F 9/5016
See application file for complete search history.

(56) References Cited

U.S. PATENT DOCUMENTS

2003/0097653 A1*  5/2003  Kim ...................... G06F 8/452
                                               717/160
2005/0015568 A1*  1/2005  Noel ................... G06F 12/0806
                                               711/206
(Continued)

OTHER PUBLICATIONS

Paphael Poss et al., Lazy Reference Counting for the Microgrid, IEEE, 2012, retrieved online on Feb. 12, 2020, pp. 41-48. Retrieved from the Internet: <URL: https://ieeexplore.ieee.org/stamp/stamp.jsp?>. (Year: 2012).*

(Continued)

*Primary Examiner* — Hanh Thi-Minh Bui
(74) *Attorney, Agent, or Firm* — Harness, Dickey & Pierce, P.L.C.

(57) ABSTRACT

A system and method for the efficient monitoring of memory allocations performed during the executing code is presented. The proposed approach analyzes the code to build a control flow graph that describes all possible execution sequences of the code. Individual execution paths are identified by an analysis of the control path and memory allocation counters representing the memory allocations of each execution path are placed in the code. The memory allocation counters provide next to data describing memory allocations also execution frequency data of execution paths. The execution frequency data is used to identify the path with the highest execution frequency. The position of the memory allocation counters is further adapted with the optimization goal that the path with the highest execution frequency triggers the least number of memory allocation counter increments.

31 Claims, 19 Drawing Sheets

(51) Int. Cl.
*G06F 11/30* (2006.01)
*G06F 11/34* (2006.01)
*G06F 9/50* (2006.01)

(52) U.S. Cl.
CPC ...... *G06F 11/3466* (2013.01); *G06F 11/3495* (2013.01); *G06F 11/3624* (2013.01); *G06F 11/3636* (2013.01); *G06F 2201/865* (2013.01); *G06F 2201/87* (2013.01); *G06F 2201/88* (2013.01); *G06F 2209/508* (2013.01)

(56) References Cited

U.S. PATENT DOCUMENTS

| | | | |
|---|---|---|---|
| 2010/0005249 A1* | 1/2010 | Bates | G06F 11/3624 711/154 |
| 2014/0157240 A1* | 6/2014 | Baca | G06F 11/3612 717/130 |
| 2015/0032752 A1 | 1/2015 | Greifeneder et al. | |

OTHER PUBLICATIONS

Elephant Tracks 2.0, RedLine Systems Research at Tufts, www.cs.tufts,edu/research/redline/elephantTracks (Mar. 2014).

Nathan Ricci et al "Elephant Tracks: Portable Production of Complete and Precise GC Traces", ISMM'13, Jun. 20-21, 2013, Seattle, Washington.

S. Fitzek et al "DuckTracks: Path-based Object Allocation Tracking", International Conference on Performance, ICPE 2017 (Apr. 2017).

Stefan Fitzek, et al., DuckTracks: Path-based Object Allocation Tracking, Published in ICPE 2017, Apr. 2017.

Search Report from European Patent Office for related European Application No. 18200848.2, dated Mar. 26, 2020.

\* cited by examiner

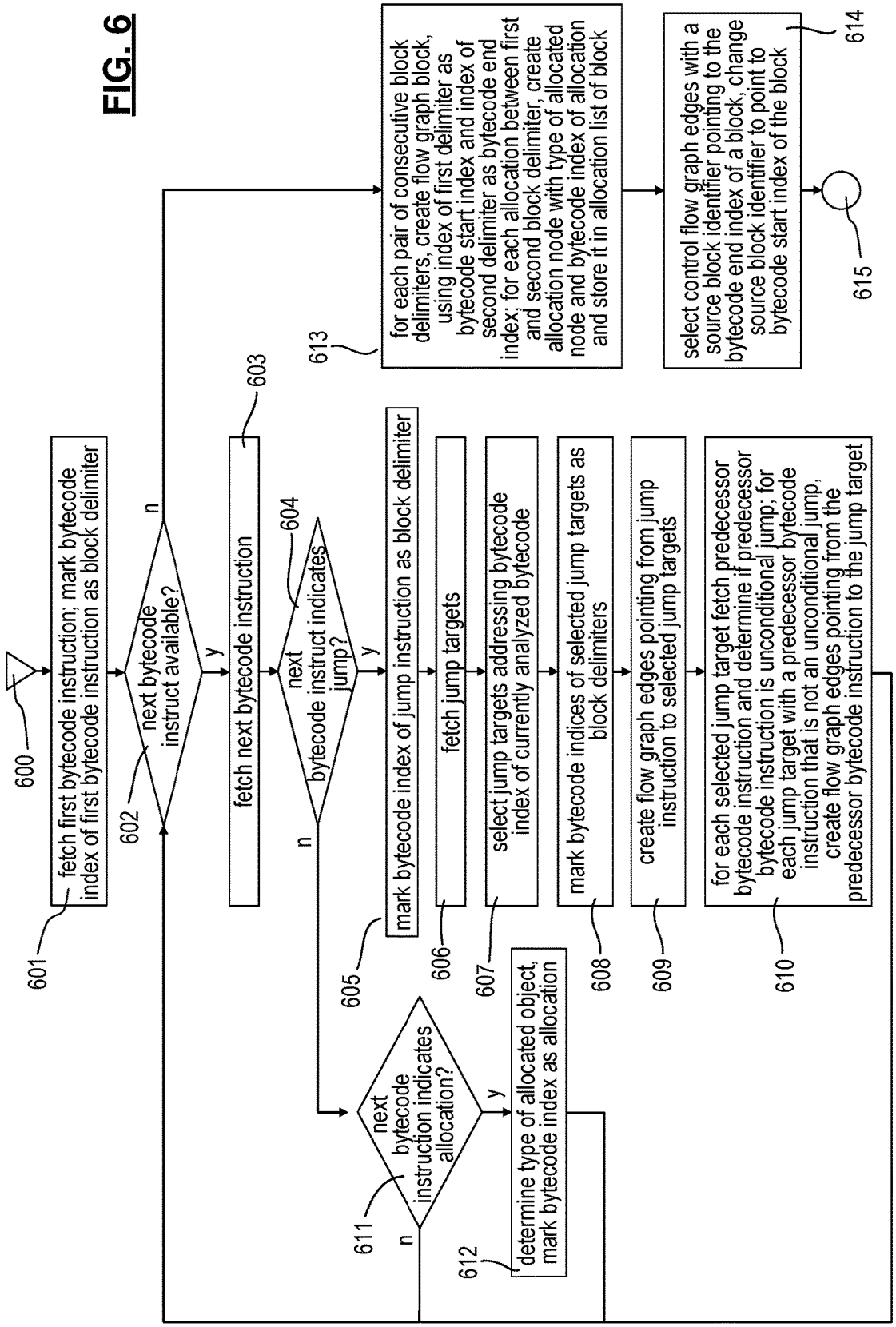

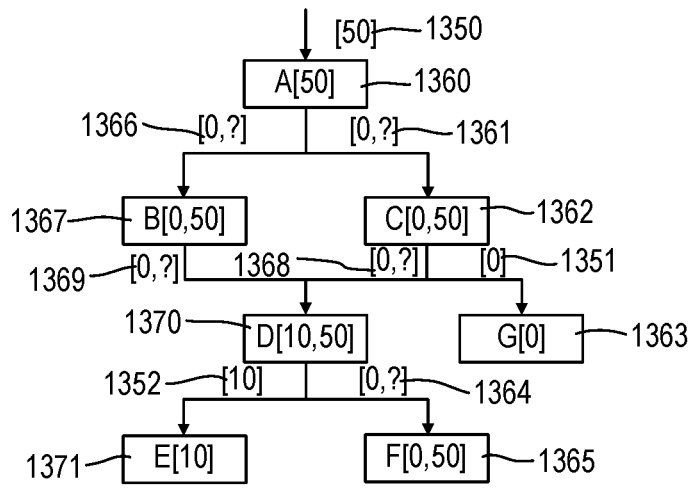
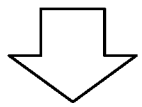
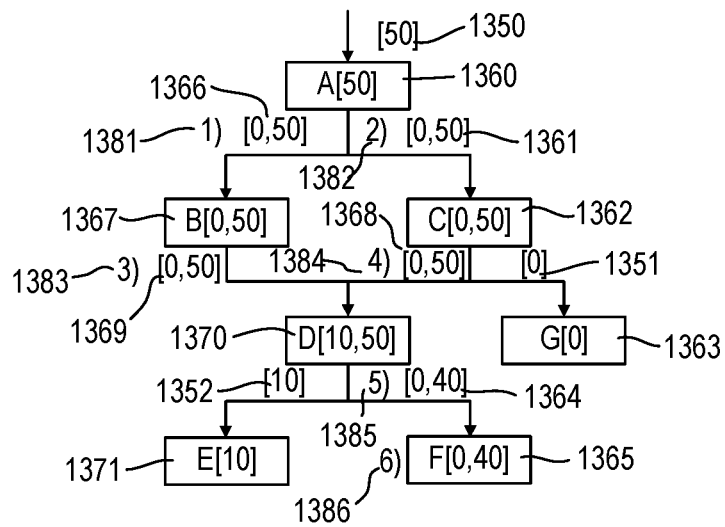
FIG. 13B
| | Legend |
|---|---|
| [10] | Measured or calculated precise frequency |
| [?] | Unknown frequency |
| [10,40] | Frequency range with known bounds |
| [?,50] | Frequency range with unknown bound |
| 1) | Sequence number of propagation step |

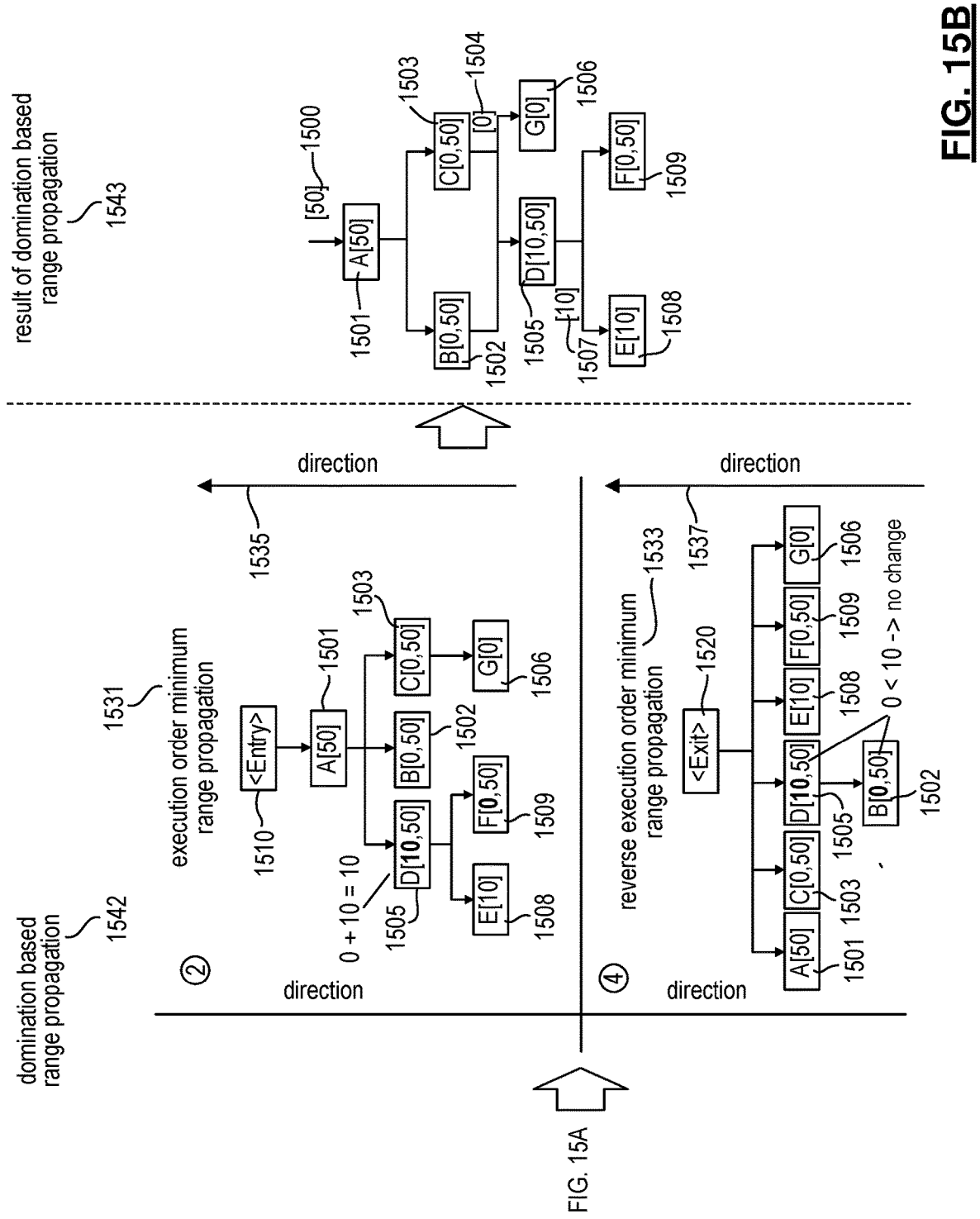

METHOD AND SYSTEM FOR SELF-OPTIMIZING PATH-BASED OBJECT ALLOCATION TRACKING

CROSS-REFERENCE TO RELATED APPLICATIONS

This application claims the benefit of U.S. Provisional Application No. 62/574,490, filed on Oct. 19, 2017. The entire disclosure of the above application is incorporated herein by reference.

FIELD

The invention relates generally to the monitoring of memory allocations during the execution of code by instrumenting the code with allocation counters and specifically to the optimized monitoring of memory allocations by determining a control flow graph of the code, identifying and prioritizing paths through the control flow graph according to their execution probability, selecting paths that perform allocations and placing for each allocating path an allocation counter in the code that represents and counts all allocations of the path.

BACKGROUND

Modern automated memory management systems like garbage collectors ease the lifetime management of heap-allocated objects, as the garbage collection system automatically detects and reclaims heap objects that are no longer reachable by currently executing code. This automatism encourages software developers to utilize heap-allocated objects, as the later deletion of those objects and the reclaiming of memory used by those objects is performed automatically and is therefore not adding complexity to the code.

However, automated memory management comes at a price in form of higher CPU usage caused by garbage collection tasks, or temporal suspensions of the execution of user code during some critical garbage collection activities.

To reduce those adverse effects of automated memory management, first portions of code that are responsible for excessive creation of heap-allocated objects needs to be identified. After those code portions are identified, they may be redesigned to cause less heap-allocations.

A prerequisite of this optimization task is the visibility of performed object allocations by executing code, while the code is executed under "real-world" or production environments. A wide variety of commercial and non-commercial allocation monitoring tools exist, which either use a heap sampling-based or an instrumentation-based approach.

The heap-sampling approach is based on cyclic heap snapshots of the monitored heap memory, e.g. form of the types and quantities of objects that exist in the heap memory when the snapshot was acquired. Statistical data may be extracted from a sequence of heap snapshot, which may be used to identify memory usage tendencies, like a constantly rising number of objects of a specific type which can be used as an indicator of a memory leak. Variants of heap-sampling approaches may fetch additional information about the objects residing in the heap-memory, including references between objects and create a detailed model of the heap at sampling time. This detailed model may be used to identify undesired object references that keep objects from being collected by the garbage collector. The drawbacks of the sampling-based approach include a relatively high impact on the monitored system, as creating a memory snapshot may require to temporarily suspend all current code executions of the monitored process or application, a relatively high level of inaccuracy as objects allocated and reclaimed between two samples are not reported, and the lack of data describing the exact code portions that caused allocation activities. Due to those shortcomings, a sampling-based monitoring approach is capable to determine whether a heap-allocation caused problem exists or not, but it provides no data to identify and fix the root cause of such a problem.

The instrumentation-based approach scans code before its execution to identify allocation activities and places an allocation counter for each allocation activity that records the number of allocations performed, the type of object that was allocated and the position at which the allocation was performed, e.g. in form of a code line number of the allocation, a name of the method or function containing the allocation and a name of the class containing the method or function. The position data may also contain data identifying a thread context. Instrumentation-based approaches provide sufficient data to track down individual object allocations to the portion of code that caused those allocations, which is a prerequisite for efficient identification and correction of heap allocation caused performance problems.

However, the instrumentation-based approaches known in the art generate an amount of overhead that is not acceptable in production environments. The monitoring overhead can easily reach 100% or more in terms of CPU usage or response time and may even distort the allocation behavior of the monitored application. One reason for this high overhead is that automated memory management systems typically maintain a "compacted" heap memory layout that supports fast allocations. In a compacted heap, all allocated objects are aligned sequentially in the heap memory, and a pointer to a first memory address not used by an object is maintained. To reserve memory space for a new allocated object it is sufficient to increase this pointer by the size of the object. In such an optimized allocation environment, even a relatively small individual monitoring overhead like incrementing a counter may sum up to an intolerable amount of overall overhead.

Consequently, there is need in the art for an allocation monitoring approach that provides the same quality of data as conventional instrumentation-based approaches without causing the same amount of monitoring overhead.

This section provides background information related to the present disclosure which is not necessarily prior art.

SUMMARY

This section provides a general summary of the disclosure, and is not a comprehensive disclosure of its full scope or all of its features The disclosed technology is directed to the instrumentation-based monitoring of heap allocation, where the instrumentation process utilized control flow data to optimize the instrumentation for minimal monitoring overhead. The disclosed instrumentation process also considers the execution probability of individual paths of the control flow graph to further optimize the instrumentation to cause the least monitoring overhead for the paths with the highest execution probability.

An agent is injected into an execution environment running a monitored application, which is configured to get notified when code is loaded by the execution environment for execution. The agent captures and analyzes the original code to create a control flow chart of the code.

Typically, code consists in instructions which are executed sequentially, and instructions that jump from the current position of the code to a target position. Those jump instructions are used to map high-level control flow structures like branches (e.g. "if" or "switch" statements) or loops (e.g. "while" or "for/each" statement) to lower level representations like bytecode.

A control flow graph is an abstract representation of a code sequence that represents all possible execution paths through the code sequence, where the code sequence has exactly one entry point and at least one exit point. It consists in control flow nodes representing portions of the code sequence that are executed in a strictly sequential order and in directed control flow edges representing transitions between those sequential code portions. Jump instructions transfer the execution sequence from the current position to the position of a jump target. Therefore, the position of a jump instruction represents the end of a control flow node. Control flow-nodes are started either at the entry point of the code sequence or at the position of jump targets. In case a control flow node starts with a jump target and this jump target is also reachable by its direct sequential predecessor instruction, the control flow node ending with the predecessor instruction and the control flow node starting with the jump target are connected with a control flow edge directed from the control flow node ending with the predecessor instruction to the control flow node starting with the jump target. Jump instructions are represented as control flow edges directed from the control flow node ended by the jump instruction to the control flow node started by the target of the jump instruction.

The created control flow graph is analyzed to first determine the most probable execution path and then all other, less probable execution paths using heuristics. The used heuristics e.g. contain the assumptions that for an "if" statement, the code block corresponding to the positive evaluation of the condition of the "if" statement is less likely than the code block corresponding to the alternative evaluation ("else" block), or that a code block that throws an exception is less likely than an alternative block that throws no exception.

For each identified execution path, an optimal position for an allocation counter is selected by calculating the control flow edge of the path that is least shared with other paths. A control flow edge is shared between two paths if it is execution is caused by the execution of each of the two paths. The optimization goal for the counter placement is a minimal overall number of allocation counter updates for all paths.

Based on the counter positions and the allocations performed by the paths, the semantics of the counter is calculated. The semantic of a counter is first determined by the allocations performed by the path it is deployed to and second by the influences of counters of other paths. As an example, a specific path may branch from its branch path at a specific branch point. The counter of the branch path may count allocations before and after the branch point. Depending on the position of the counter of the branch path relative to the branch point, the semantic of the counter of the current path may need to compensate either allocations that were counted but not performed (i.e. counter of branch path is before branch point and counts not performed allocations after branch point) or allocations that were performed but not counted (i.e. counter of branch path is after branch point and counts of allocations before branch point are missed).

After counter positions and semantics are calculated, the code may be instrumented by adding code that counts the execution of the identified paths to create instrumented code which is provided to the execution environment for execution instead of the original code.

During execution, the instrumented code increments the counters which describe the performed allocations.

Some embodiments may use the counter updates to determine a path execution frequency and use the path execution frequency instead of heuristics to determine the execution probability of paths, calculate optimal counter positions and semantics based on the frequency data and then re-instrument code using the new counter position and semantic data. Some variants of this embodiment may perform the execution frequency-based optimization once, other variants may cyclically examine the execution frequency data calculate optimal instrumentation data and then re-instrument the code. Re-instrumentation may be performed by adding counter execution code according to new calculated counter position data to the original code. The currently existing version of instrumented code may be discarded and replaced by the re-instrumented code.

Other embodiments may also monitor events that cause unexpected termination of the execution of monitored code, like exceptions. An exception causes the termination of the current code execution sequence and a jump to a code sequence that handles this exception. Therefore, not all intended and counted allocations of a code sequence may be executed due to an exception. Those other embodiments may place sensor code into monitored code that detects the occurrence of exceptions and records the position at which the exception terminated a monitored code execution sequence. This recorded position data may be used to correct allocation count data that incorrectly represents allocations that would have been performed after the unexpected execution termination.

In one example embodiment, the computer-implemented method for monitoring memory allocation during execution of an application in a distributed computing environment comprises: identifying execution paths in an application using a control flow graph, where each node in the control flow graph belongs to only one identified execution path and the application resides on a computing device; for each identified execution path in the application, determining memory allocations which occur during execution of a given execution path; for each identified execution path in the application, determining only one location for an allocation counter in the given execution path, where the allocation counter in the given execution path increments in response to execution of the given execution path; and for each identified execution path in the application, instrumenting the given execution path with an allocation counter at the location, where the allocation counter is placed at the location in the given execution path and the allocation counter reports a count value for the allocation counter.

The location for the allocation counter in the given execution path may be an edge in the control flow graph along the given execution path that is least shared amongst the identified execution paths.

In one aspect, bytecode for the application is intercepted by an agent while the application is being loaded, and the control flow graph is extracted from the bytecode before the step of identifying execution paths in the application. The method further includes: receiving, by the agent, the count value reported by the allocation counter; formulating, by the agent, memory allocation data for the given execution path, where the memory allocation data includes the count value reported by the allocation counter; and sending, by the agent, the memory allocation data to a monitoring server located remotely from the first computing device. The method also includes: monitoring, by a sensor instrumented in the application, execution of a transaction which performed the memory allocations; sending, by the sensor, transaction data to the monitoring server, where the transaction data includes an identifier for the transaction; and correlating, by the monitoring server, the transaction data with the memory allocation data, wherein the memory allocation data includes at least one of the identifier for the transaction or an identifier for a thread which executed the application. The memory allocation data formulated by the agent includes an identifier for the allocation counter, location of the allocation counter in the given execution path, the count value for the allocation counter, and semantics of a counter increment in form of allocations represented by one counter increment.

For the given execution path, semantics of an increment of the allocation count of the given execution path are determined as sum of memory allocation performed by the given execution path and corrections for memory allocations reported by another allocation counter in an execution path different than the given execution path. The corrections for quantities of memory allocations are further defined as subtracting memory allocations from sum of memory allocation performed in a predecessor execution path that precedes the given execution path when the given execution path branches from the predecessor execution path after the allocation counter in the predecessor execution path, where the memory allocation subtracted from the sum are the memory allocations situated after the given execution path branches from the predecessor execution path; adding memory allocations to sum of memory allocation performed in a predecessor execution path that precedes the given execution path when the given execution path branches from the predecessor execution path before the allocation counter in the predecessor execution path, where the memory allocation added to the sum are the memory allocations situated before the given execution path branches from the predecessor execution path; subtracting memory allocations from sum of memory allocation performed in a joined execution path that follows the given execution path when the given execution path joins the joined execution path before the allocation counter in the joined execution path, where the memory allocation subtracted from the sum are the memory allocations situated before the given execution path joins the joined execution path; and adding memory allocations to sum of memory allocation performed in the joined execution path that follows the given execution path when the given execution path joins from the joined execution path after the allocation counter in the joined execution path, where the memory allocation added to the sum are the memory allocations situated after the given execution path joins the joined execution path.

In another aspect, a location for an allocation counter is determined by counting, for each edge in the given execution path, a number of other paths that join the given execution path before the edge; counting, for each edge in the given execution path, the number of other paths that branch from the given execution path after the edge; summing, for each edge in the given execution path, the counts; and selecting the edge in the given execution path having the lowest sum as the location for the allocation counter. Identifying edges in the given execution path that are connected to at least one node in the control flow graph that performs a memory allocation; and selecting the edge in the given execution path having the lowest sum and identified as being connected to at least one node in the control flow graph that performs a memory allocation.

Identifying execution paths in an application may include determining a main execution path by starting at an entry point and traversing the control flow graph until an exit point is reached, where the main execution path is most likely path executed in the application; determining one or more secondary execution paths for the application by starting at a branch point along the main execution path and traversing the control flow graph until joining an identified execution path or an exit point is reached; determining additional secondary execution paths for the application by starting at a branch point along one of the secondary execution paths and traversing the control flow graph until joining an identified execution path or an exit point is reached; and repeating the determining of additional secondary execution paths for all of the branch points along the secondary execution paths. Traversing the control flow graph further comprises recording frequency at which the identified execution paths are being executed during execution of the application and, upon reaching a branch point along the control flow graph, selecting a branch exiting the branch point having largest execution frequency.

Identifying execution paths in an application may also include recording frequency at which the identified execution paths are being executed during execution of the application; identifying execution paths in the application using a static rule set when the recorded frequency is less than a threshold; and identifying execution paths in the application using the recorded frequency when the recorded frequency data is not available.

In another aspect, the method includes detecting unexpected execution termination along the given execution path before execution of the given execution path is completed; identifying the given execution path affected by the termination; determining whether the allocation counter in the given execution path was executed before the termination; identifying memory allocations performed in the given execution path after the termination and adjusting quantities of memory allocations reported by the agent by subtracting counts of memory allocations that were not performed when the allocation counter in the given execution path was executed before the termination; and identifying memory allocations performed in the given execution path before the termination and adjusting quantities of memory allocations reported by the agent by adding counts of memory allocations that were performed when the allocation counter in the given execution path was not executed before the termination.

In yet another aspect, the method includes: collecting count values from the allocation counters instrumented in the first set of execution paths; identifying a second set of execution paths in the application using the count values collected from the allocation counters instrumented in the first set of execution paths, where the second set of execution paths includes one or more execution paths that differ from the execution paths in the first set of execution paths; for each identified execution path in the second set of execution paths, determining a location for an allocation counter in an identified execution path, where the location for the allocation counter in the identified execution path is an edge in the control flow graph along the identified execution path that is least shared amongst the identified execution paths; and for each identified execution path in the second set of execution paths, re-instrumenting the identified execution path with only one allocation counter.

In an second example embodiment, the computer-implemented method for monitoring memory allocation during execution of an application in a distributed computing environment comprises: identifying a first set of execution paths in an application using a control flow graph, where each node in the control flow graph belongs to only one identified execution path and the application resides on a computing device; for each identified execution path in the first set of execution paths, instrumenting a given execution path with an allocation counter, where the allocation counter in the given execution path increments in response to execution of the given execution path and the allocation counter reports a count value of the allocation counter; collecting count values from the allocation counters instrumented in the first set of execution paths; identifying a second set of execution paths in the application using the count values collected from the allocation counters instrumented in the first set of execution paths, where the second set of execution paths includes one or more execution paths that differ from the execution paths in the first set of execution paths; for each identified execution path in the second set of execution paths, determining a location for an allocation counter in an identified execution path, where the location for the allocation counter in the identified execution path is an edge in the control flow graph along the identified execution path that is least shared amongst the identified execution paths; and for each identified execution path in the second set of execution paths, re-instrumenting the identified execution path with only one allocation counter.

The location for the allocation counter in the given execution path is an edge in the control flow graph along the given execution path that is least shared amongst the identified execution paths.

In one aspect, the method includes receiving, by an agent, the count value reported by the allocation counter, where the agent resides on the computing device; formulating, by the agent, memory allocation data for the given execution path, where the memory allocation data includes the count value reported by the allocation counter; and sending, by the agent, the memory allocation data to a monitoring server located remotely from the first computing device. The method also includes: monitoring, by a sensor instrumented in the application, execution of a transaction which performed the memory allocations; sending, by the sensor, transaction data to the monitoring server, where the transaction data includes an identifier for the transaction; and correlating, by the monitoring server, the transaction data with the memory allocation data, wherein the memory allocation data includes at least one of the identifier for the transaction or an identifier for a thread which executed the application.

The memory allocation data formulated by the agent includes an identifier for the allocation counter, location of the allocation counter in the given execution path, the count value for the allocation counter, and semantics of a counter increment in form of allocations represented by one counter increment.

The a second set of execution paths in the application is identified only when the count values exceed a threshold.

Prior to the step of identifying a second set of execution paths, count values to nodes and edges in the control flow graph with unknown count values are propogated using a propagation rule set.

In another aspect, the method includes recursively propagating count values to nodes and edges in the control flow graph with unknown count values using a propagation rule set; identifying one or more nodes or edges in the control flow graph with unknown count values; recursively propagating count values to nodes and edges in the control flow graph with unknown count values using dominance relationships between nodes and post dominance relationships between nodes when one or more nodes or edges in the control flow graph are identified with unknown count values; determining whether new count values were propagated using dominance relationships and post dominance relationships and repeating the steps of recursively propagating count values when new count values were propagated using dominance relationships and post dominance relationships. The method further includes: recursively propagating ranges for count values to nodes and edges in the control flow graph with unknown count values using dominance relationships between nodes and post dominance relationships between nodes; identifying one or more nodes or edges in the control flow graph with unknown count values; and recursively propagating ranges for count values to nodes and edges in the control flow graph with unknown count values using the propagation rule set.

Count values to nodes and edges in the control flow graph are propogated using dominance relationships between nodes and post dominance relationships between nodes by generating a dominance tree from the control flow graph; generating a post dominance tree from the control graph; identifying pairs of nodes that are in both a dominance relationship and a post dominance relationship; and propagating the count values between the identified pair of nodes.

A computer-implemented system is also provided for monitoring memory allocation during execution of an application in a distributed computing environment. An agent is instrumented on a host computing device, where the application resides on the host computing device and is executed by a processor of the host computing device. The agent includes: a control flow extractor configured to receive bytecode for the application and construct a control flow graph for the application from the bytecode; a path builder configured to identify execution paths in the application such that each node in the control flow graph belongs to only one identified execution path; a counter positioner configured to receive the identified execution paths from the path builder and, for each identified execution path, determines a location for an allocation counter in a given execution path; and instrumentor configured to receive the determined locations of the allocation counters and, for each identified execution path, instruments the given execution path with an allocation counter at the determined location for the given execution path, where the allocation counter increments in response to execution of the given execution path and reports a count value for the allocation counter.

The counter positioner determines a location for the allocation counter in the given execution path that is an edge in the control flow graph along the given execution path that is least shared amongst the identified execution paths.

In one aspect, the counter positioner determines a location for the allocation counter in the given execution path by counting, for each edge in the given execution path, a number of other paths that join the given execution path before the edge; counting, for each edge in the given execution path, the number of other paths that branch from the given execution path after the edge; summing, for each edge in the given execution path, the counts; and selecting the edge in the given execution path having the lowest sum as the location for the allocation counter.

The agent further includes a counter semantic calculator that determines semantics of an increment of the allocation count of the given execution path as sum of memory allocation performed by the given execution path and corrections for memory allocations reported by another allocation counter in an execution path different than the given execution path. The counter semantics calculator corrects for memory allocations by subtracting memory allocations from sum of memory allocation performed in a predecessor execution path that precedes the given execution path when the given execution path branches from the predecessor execution path after the allocation counter in the predecessor execution path, where the memory allocation subtracted from the sum are the memory allocations situated after the given execution path branches from the predecessor execution path; adding memory allocations to sum of memory allocation performed in a predecessor execution path that precedes the given execution path when the given execution path branches from the predecessor execution path before the allocation counter in the predecessor execution path, where the memory allocation added to the sum are the memory allocations situated before the given execution path branches from the predecessor execution path; subtracting memory allocations from sum of memory allocation performed in a joined execution path that follows the given execution path when the given execution path joins the joined execution path before the allocation counter in the joined execution path, where the memory allocation subtracted from the sum are the memory allocations situated before the given execution path joins the joined execution path; and adding memory allocations to sum of memory allocation performed in the joined execution path that follows the given execution path when the given execution path joins from the joined execution path after the allocation counter in the joined execution path, where the memory allocation added to the sum are the memory allocations situated after the given execution path joins the joined execution path.

In another aspect, the agent receives the count value reported by the allocation counter and stores the count value in a counter repository.

A monitoring server may be located remotely across a network from the host computing device, where the agent periodically retrieves the count value from the counter repository, formulates memory allocation data for the given execution path and send the memory allocation data to the monitoring server, where the memory allocation data includes the count value. A sensor is instrumented in the application, where the sensor monitors execution of a transaction which performs memory allocations and sends transaction data over the network to the monitoring node. The transaction data may include at least one of an identifier for the transaction or an identifier for a thread which executed the application.

Variants of above embodiments may record allocation count data on a global, process level to provide overall allocation count data representing the whole runtime of the process. Other variants may provide allocation count on a thread level and still other variants may combine allocation monitoring with transaction execution monitoring and provide allocation count data with a per transaction Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 provides a block diagram showing a monitoring system consisting in a monitoring server and an agent deployed to a monitored application, where the agent uses control path optimized allocation counters to monitor memory allocations.

FIG. 2 shows a block diagram of an agent that illustrates the interaction of different components like a control flow extractor, a path graph builder, a counter positioner and an instrumentor to convert original bytecode into instrumented byte code for the optimized monitoring of memory allocations.

FIG. 3 describes sequential conversion steps to create instrumented byte code from original byte code.

FIG. 4 contains a flow chart that describes the initial creation of instrumented byte code from original byte code and the continuous monitoring of control flow frequency data and adaptation of the instrumented byte code to changed control flow frequencies.

FIGS. 5A-5D conceptually describes data records that may be used to model control flow graphs, execution paths and per execution path allocation counters.

FIG. 6 contains a flow chart that describes the processing of original byte code of a method to create a control flow graph describing the original byte code.

FIG. 7 provides a flow chart of the process that identifies the most probable path through the control flow graph of a method.

Figure 10:
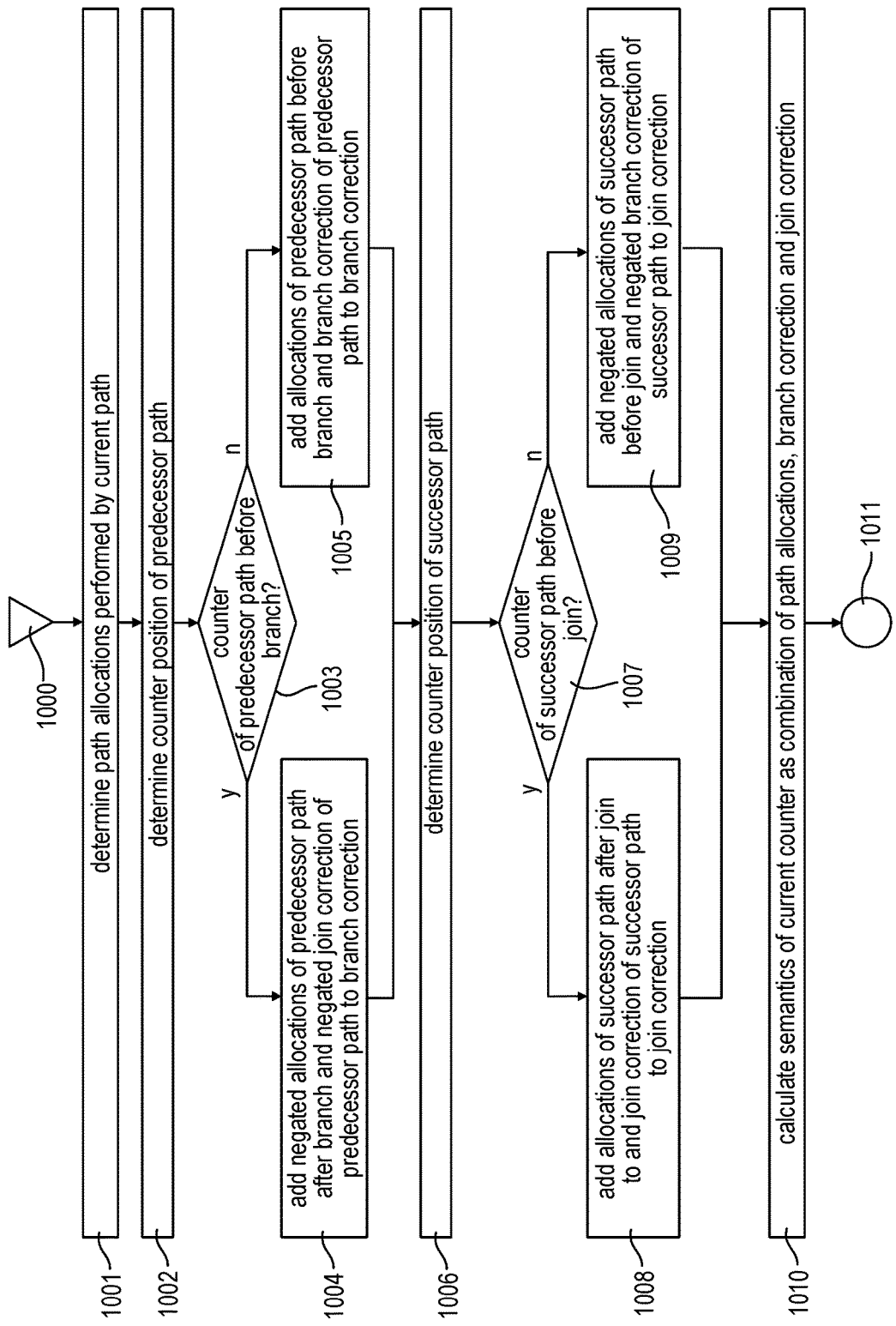

FIG. 10 provides the flow chart of a process that calculates the semantic of an allocation counter of a path.

Figure 11:
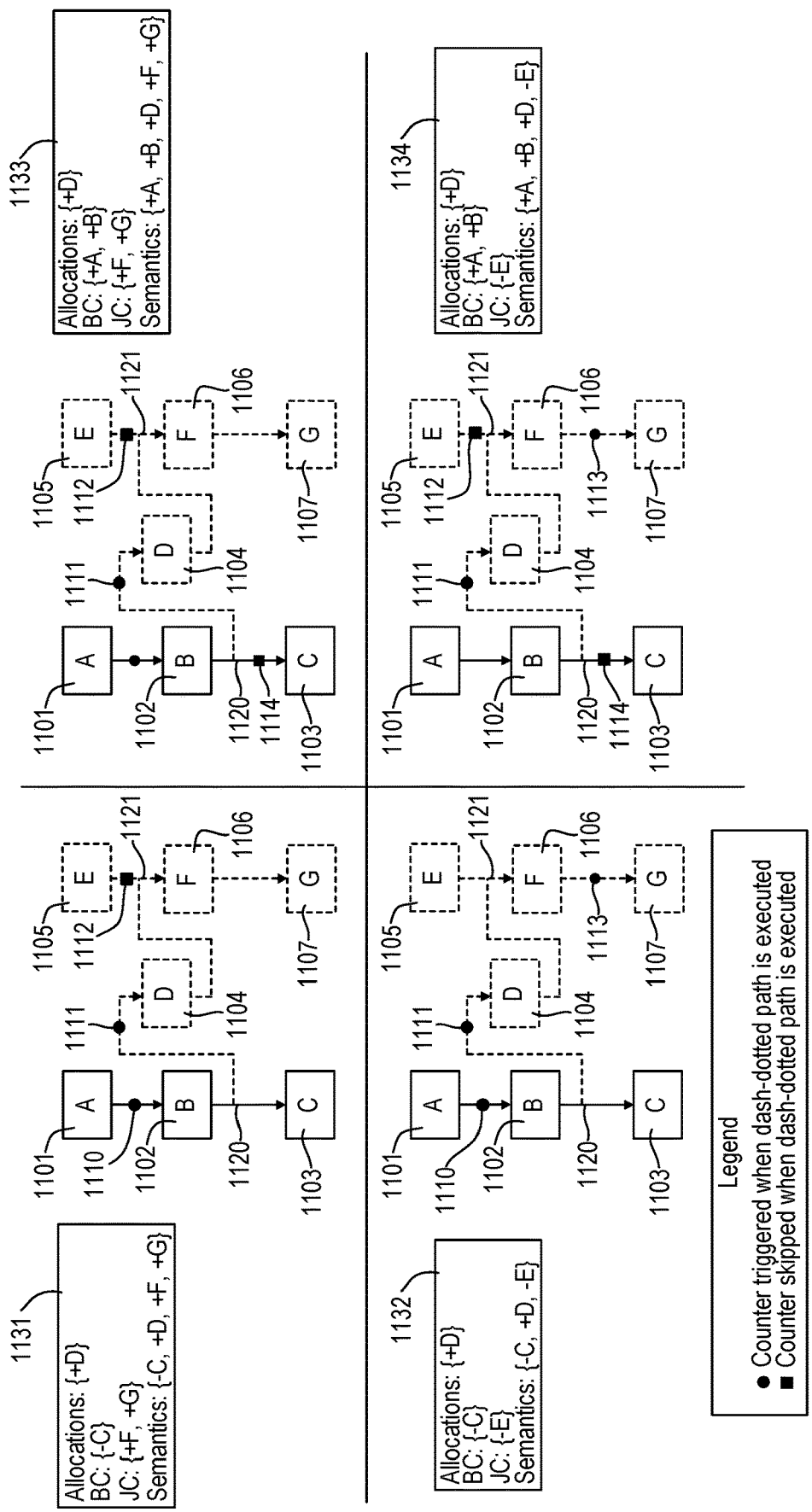

FIG. 11 describes the determining of the semantic of an allocation counter by considering the allocation counter semantic of adjacent paths by an example.

Figure 12:
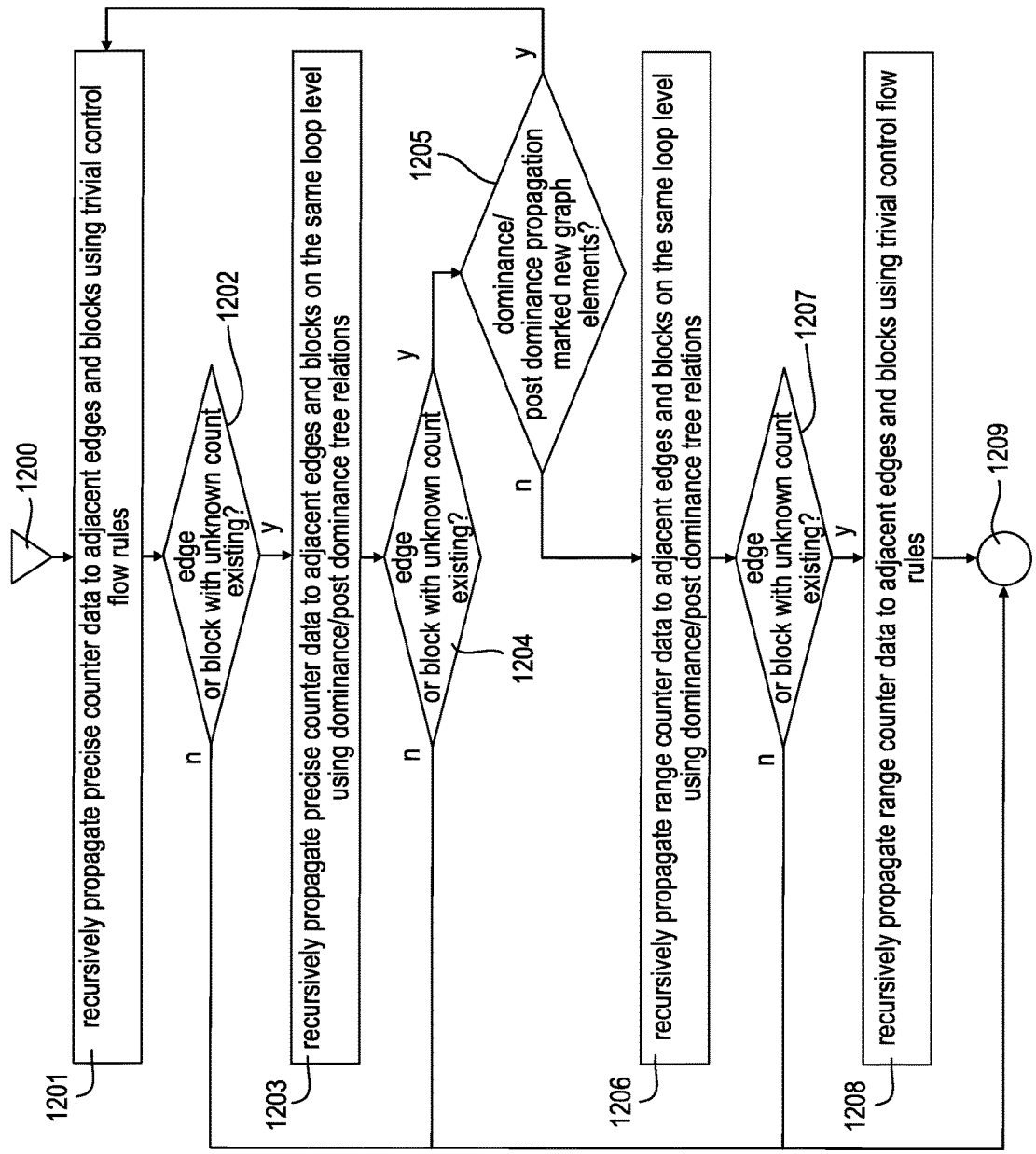

FIG. 12 shows the flow chart of a process that uses measured execution frequency data describing the execution frequency of portions of the control flow graph of a method to calculate execution frequencies for portions of the control path for which no measured execution frequency is available.

Figure 13A:
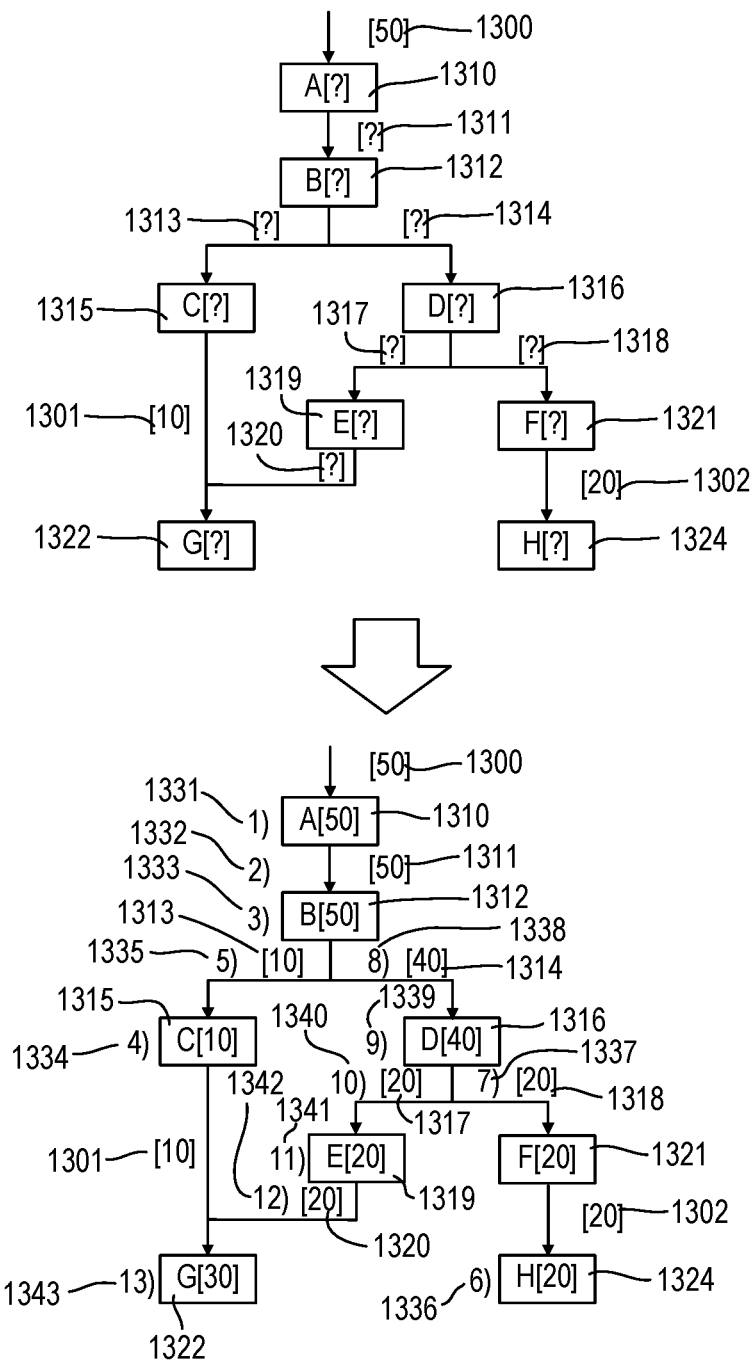

FIGS. 13A and 13B exemplary describes the calculation of execution frequency data using trivial propagation rules.

Figure 14:
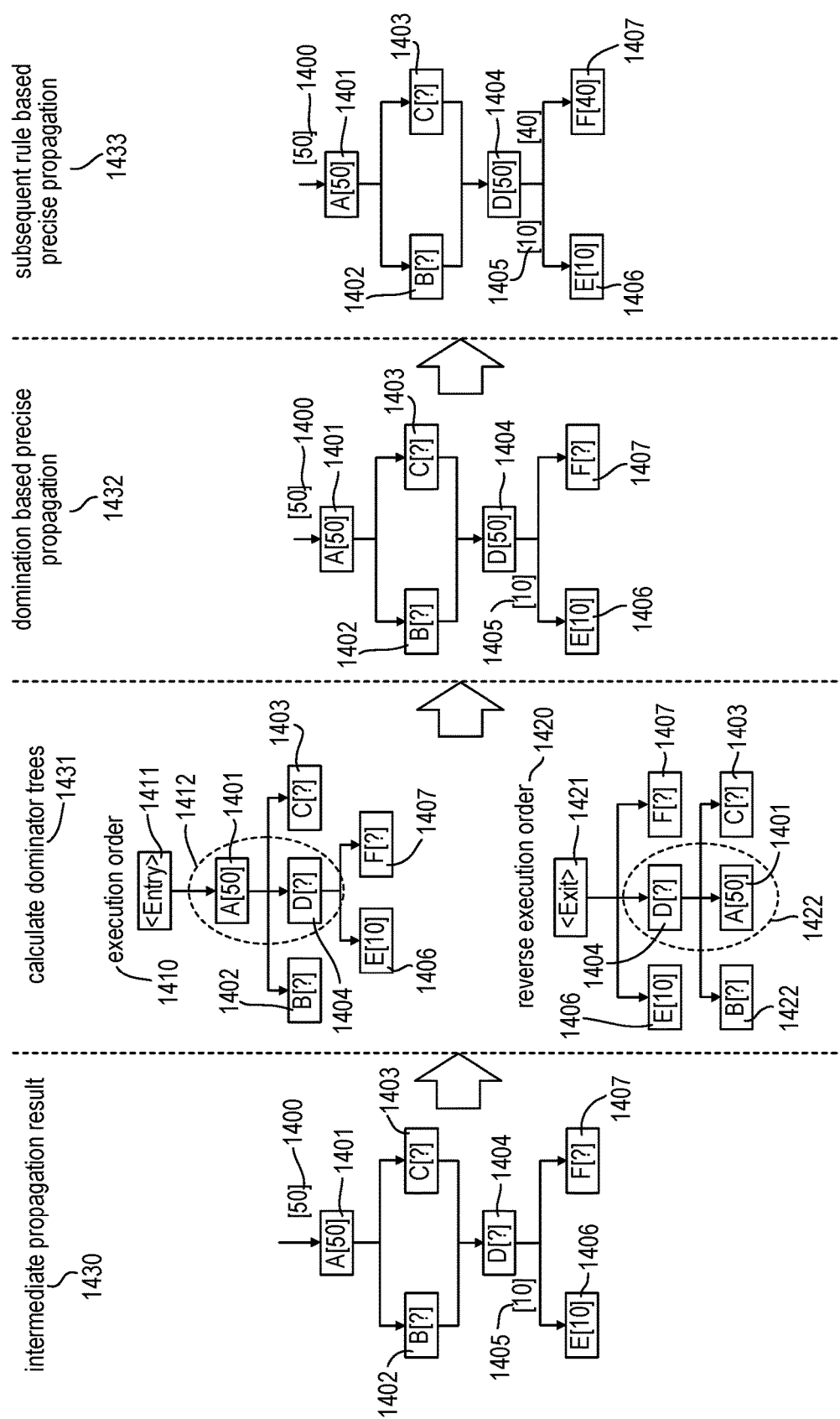

FIG. 14 shows an exemplary calculation of exact execution frequency data using dominance trees.

Figure 15A:
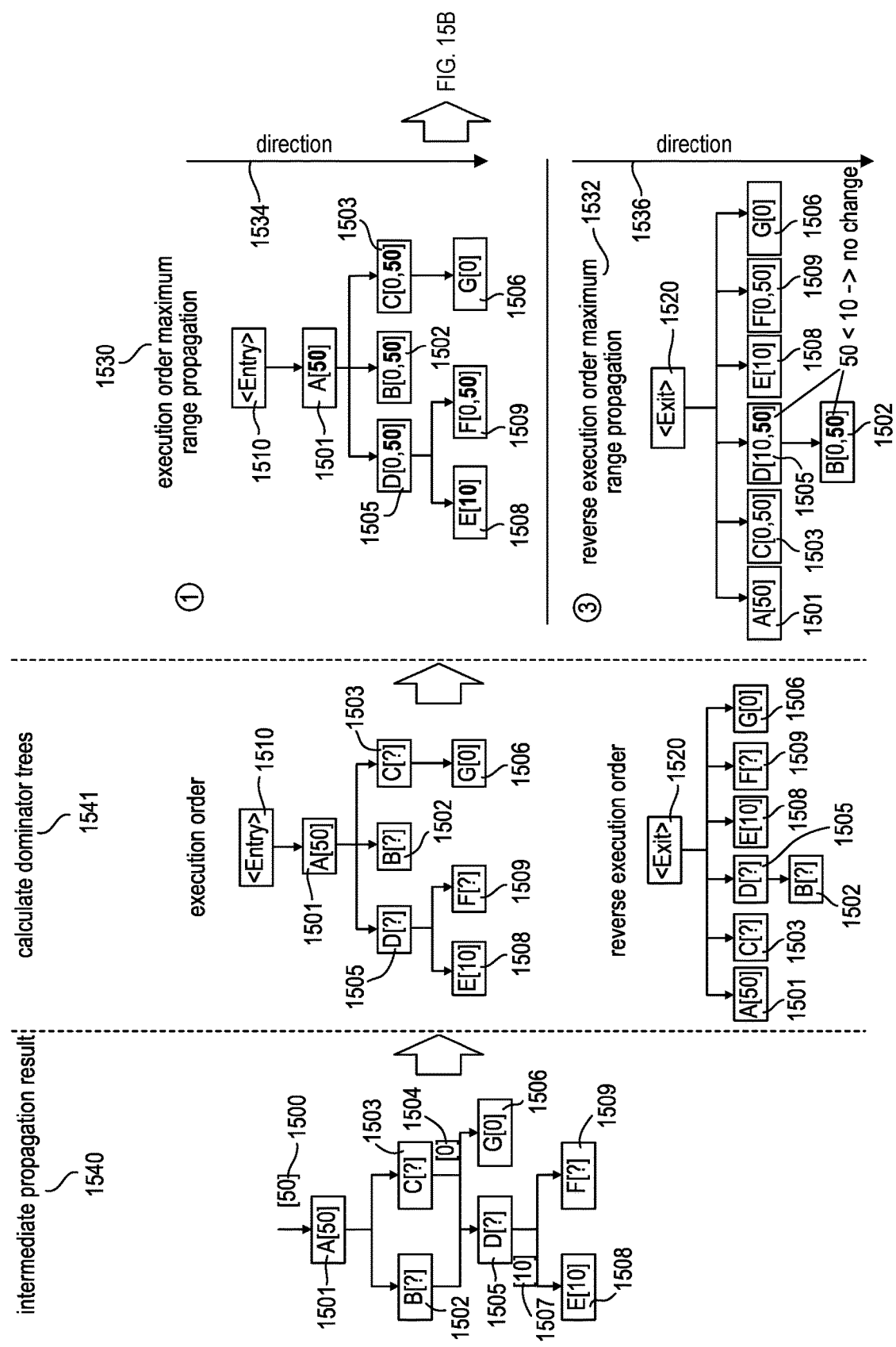

FIGS. 15A and 15B describes the calculation of execution frequency range data using dominance trees by an example.

Figure 16A:
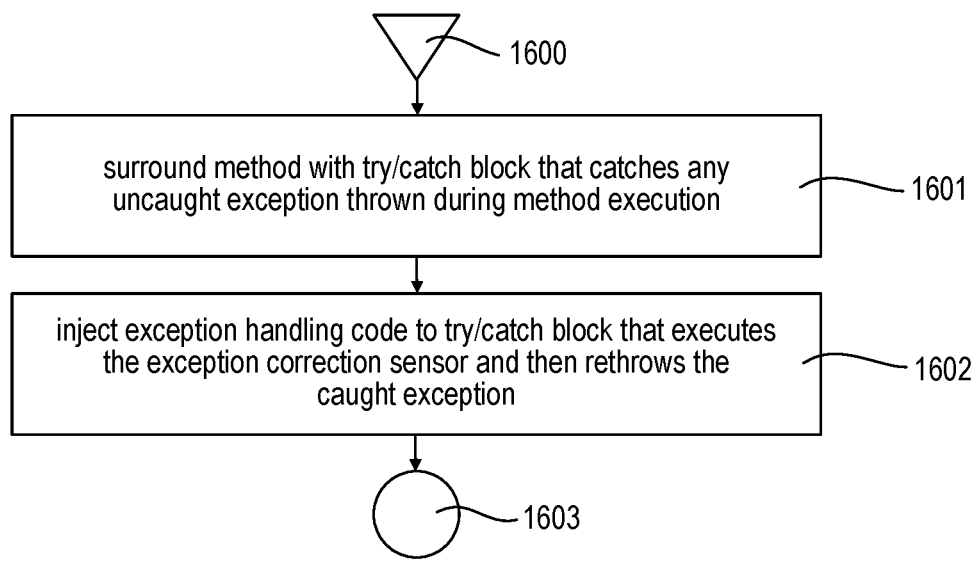
Figure 16B:
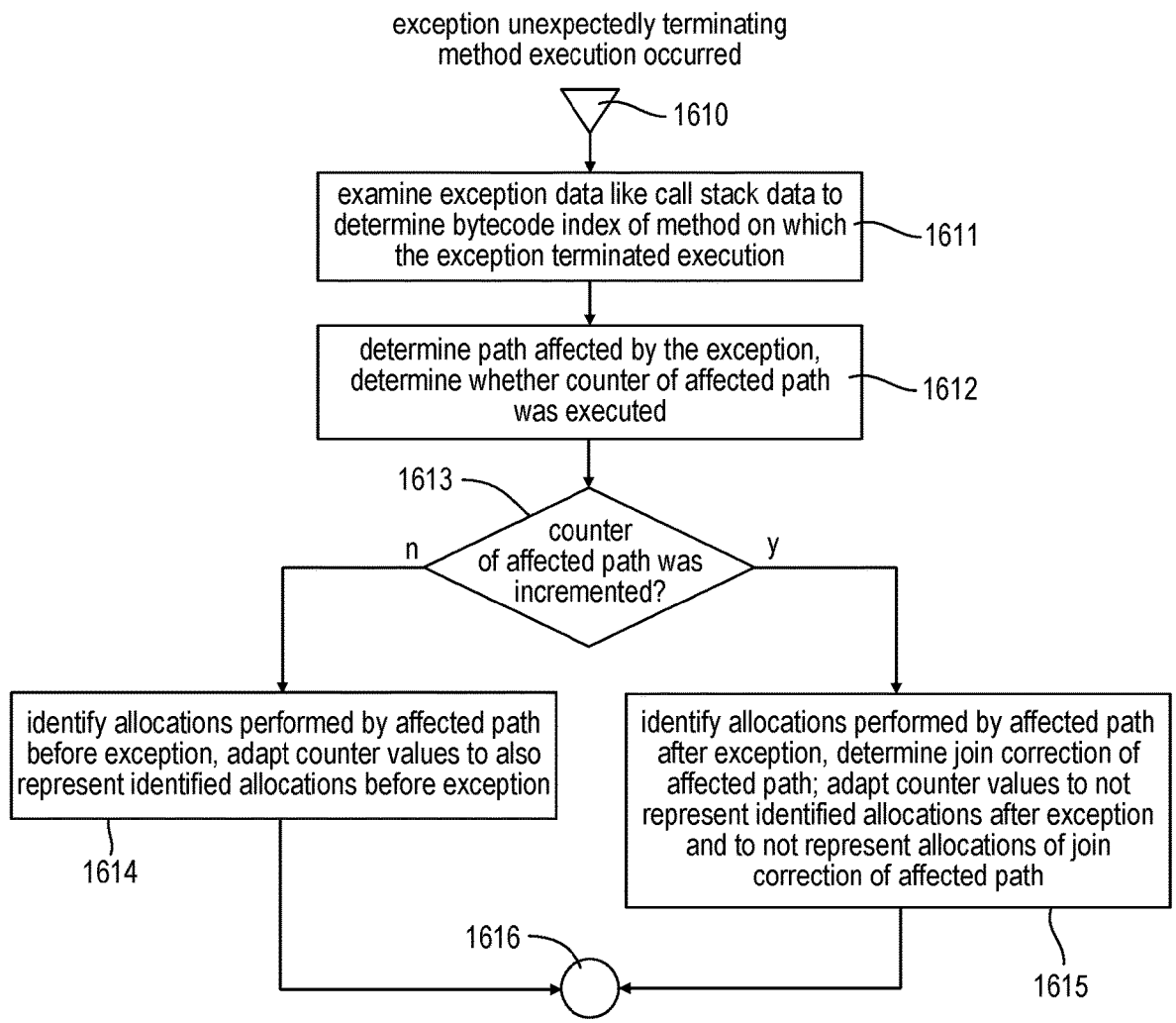

FIGS. 16A and 16B conceptually describes the correction of allocation count data in case of an exception.

Corresponding reference numerals indicate corresponding parts throughout the several views of the drawings.

DETAILED DESCRIPTION

Example embodiments will now be described more fully with reference to the accompanying drawings.

The present technology monitors memory allocations executed during the execution of code and provides details about those allocations consisting in data describing the allocation e.g. in form of the type of allocated element and in data describing the context of the allocation, like data describing the position of the allocation in the code consisting e.g. in class name, method name and line number or an identifier of a thread or transaction which performed the allocation.

Instrumentation technologies are used to acquire data about executed memory allocations, but instead of instrumenting each allocation instruction with a counter to gather allocation data, the present technology analyzed the control structure of the monitored code to identify portions of code that are executed in a strictly sequential way and which contain at least one allocations. One counter may be placed in such identified code portions which then represents and counts all allocations performed by a code portion. Therefore, one counter increment may count multiple memory allocations which considerably reduces the monitoring overhead.

Figure 1:
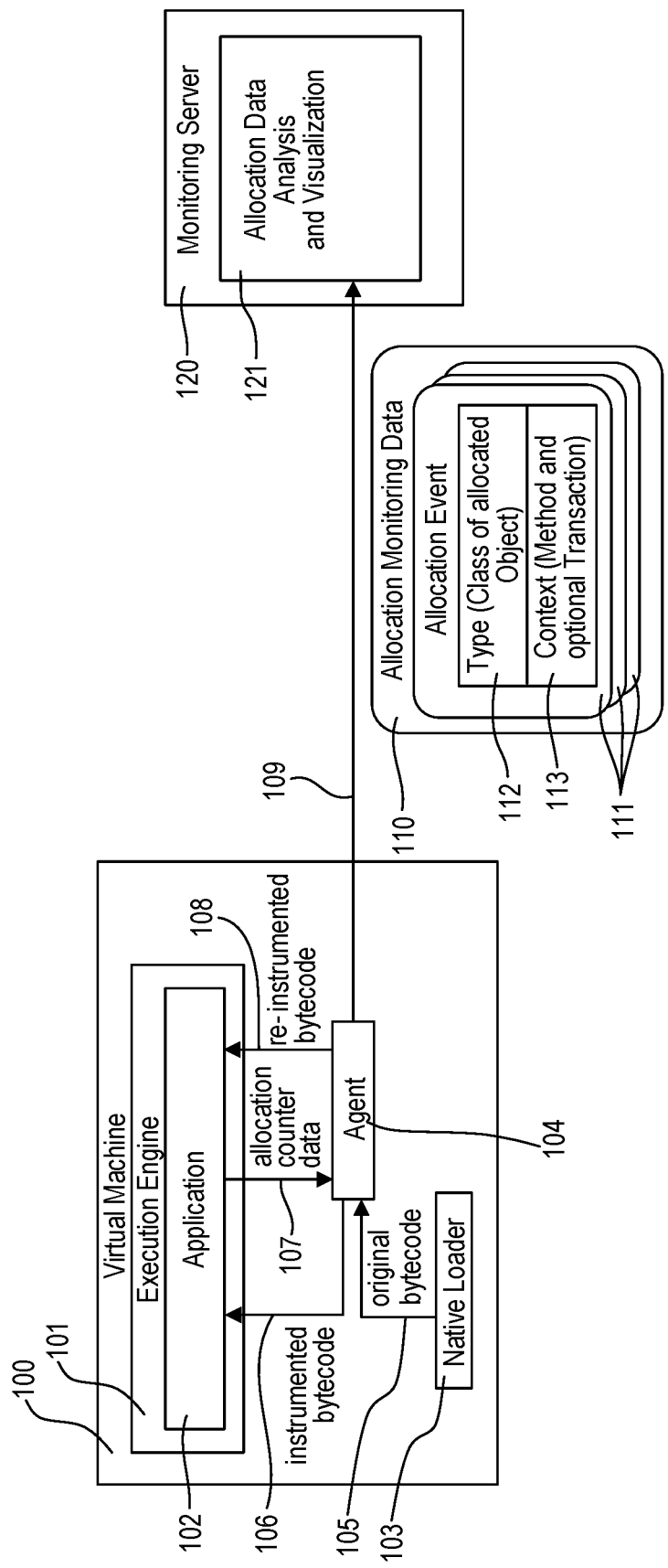

A conceptual overview of an allocation monitoring system is depicted in FIG. 1. The system consists in an agent 104 injected into a virtual machine 100 that executes an application 102, and a monitoring server 120 that communicates with the agent 104 to receive allocation monitoring data. The virtual machine may be an Oracle Java® virtual machine executing bytecode.

The agent 104 monitors and intercepts the loading of original bytecode 105 by a native loader 103. The native loader may load the original byte code from a persistent storage like a hard disc when it is required for the execution of the application. The agent 104 receives the original bytecode, analyzes it to extract the control flow graph of the byte code and uses this control flow graph data to determine data describing an overhead optimal allocation instrumentation for the original bytecode that minimizes the number of counter increments required to monitor all allocations performed by the original bytecode. Determining the optimal instrumentation may also include the identification of a most probable execution path using heuristics. The instrumentation may be performed in a way that the most probable execution path contains the least counters to further reduce the monitoring overhead.

The original bytecode is transformed into instrumented bytecode using the previously determined instrumentation description data and the instrumented bytecode is forwarded to the execution engine 101 of the virtual machine instead of the original bytecode.

The application 102 executes the instrumented bytecode which in turn executes the allocation counters which create allocation counter data 107 which is received by the agent. The agent 104 uses the counter allocation data to create allocation monitoring data 110 describing observed allocations, which is sent 109 to the monitoring server 120 for analysis. The allocation counter data 107 is further used to calculate execution frequencies of different execution paths through the instrumented bytecode. The execution frequency data may be used to determine if the assumption about the most probable execution path used for the last instrumentation is still valid, e.g. by checking if this execution path has the highest execution frequency. In case another path has the highest execution frequency, a new variant of instrumented bytecode is created that is optimized for the path with the highest execution frequency. This re-instrumented bytecode 108 is then used for further executions.

Allocation monitoring data 110 may contain multiple allocation event records 111, each allocation event containing data describing the allocation, e.g. in form of a type 112 of the allocated element, and data describing the context of the allocation 113, e.g. in form of data describing the position of the allocation in source code like consisting in the name of a method in which the allocation occurs, the name of the class containing the allocating method, and a line number describing the exact position of the allocation within the method. The context data may also contain data describing the runtime context of the monitored allocation, like an identifier for a thread or a transaction which performed the allocation.

The allocation monitoring data is received by the monitoring server 120 which forwards it to an allocation data analysis and visualization module for further processing.

The allocation monitoring concepts and mechanisms described herein may also be combined with a transaction tracing system as e.g. described in U.S. Pat. No. 8,234,631 "Method and System for Tracing Individual Transactions at the Granularity Level of Method Calls Throughout Distributed Heterogeneous Applications without Source Code Modifications" by Greifeneder et al. Basically, the transaction tracing system monitors detects when the execution of a transaction enters and exits a thread and stores correlation and measurement data in a thread-global storage area (e.g. a ThreadLocal object in the Java® programming environment.). To combine the described allocation monitoring approach with such a transaction tracing system it would be sufficient to store allocation counter update data in a thread-global storage area that is accessible for the transaction tracing system, to capture an allocation count state for a thread when a monitored transaction enters and exits the thread and to calculate the allocations performed by the monitored transaction within the thread as difference of the allocation counts at thread entry and exit.

The agent 110 may employ various strategies to send allocation monitoring data to the monitoring server. Those strategies may contain but are not limited to sending allocation monitoring data with every counter update, sending it cyclically like e.g. every 10, 30 or 60 seconds, sending it when a thread is terminated or sending it only once, before the process running the agent is terminated. In case the herein described allocation monitoring technology is combined with a transaction tracing technology, sending send allocation monitoring data may be performed when a monitored transaction exits a thread of the application or if the monitored transaction terminates or exits the monitored process.

Figure 2:
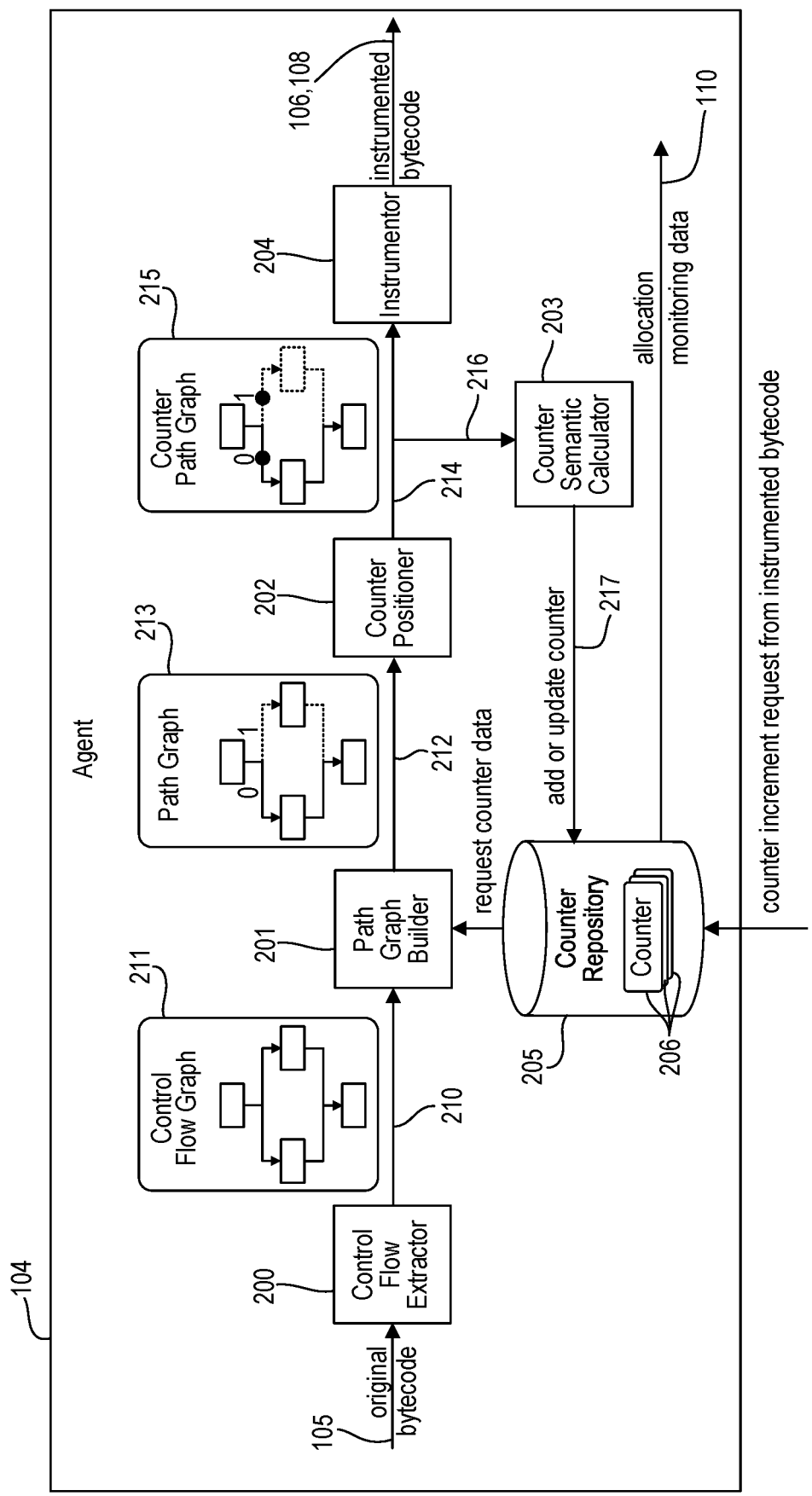

Referring now to FIG. 2, which shows a block diagram of the agent 104 illustrating the components used to analyze incoming original bytecode, to generate instrumented bytecode with optimal allocation instrumentation, and to store, process and forward allocation counter data.

The agent 104 receives original bytecode 105 which is forwarded to a control flow extractor module 200. The control flow extractor module analyzes the received bytecode to create a corresponding control flow graph 211. Typically, bytecode and other code consists in a sequence of instructions that perform tasks like arithmetical or logical operations and instructions that transfer the execution to another position in the execution sequence, like jumps. Those jump instructions may be used to implement loops or conditional executions. A control flow graph consists in nodes which represent sequences of instructions and directed edges that represent transitions between those sequences. It describes all possible execution paths of the received original bytecode. The extracted control flow graph 211 is forwarded 210 to a path graph builder 201.

The path graph builder 201 analyzes the received control flow graph 211 to identify paths through the control flow graph. A path represents an alternating sequence of nodes, starting with a start node and ending with an end node. Each node in the control flow graph belongs to exactly one path. On a branch in the control flow graph (i.e. a node with more than one outgoing edges), the incoming path (i.e. the path to which the node with more than one outgoing edges belongs) is continued at one of the arms of the branch and new paths are started with each other arm. On a join in the control flow graph (i.e. a node with more than one incoming edges), the outgoing path (i.e. the path to which the node with the more than one incoming edges belongs) is continued and the paths of all other incoming arms end.

There exist various ways to identify such paths through the control flow graph. The path graph builder uses an approach that prioritizes paths with high execution probability. The path graph builder may first identify the path with the highest execution probability or "hot" path, e.g. by starting at the entry edge of the control flow graph and then following at each branch the most probable arm until a node with no outgoing edge is found. After the "hot" path is detected, the path graph builder may, to identify all the other paths through the control flow graph, follow all lower priority arms of branches until either a node with no outgoing edges or a join with an already existing path is found.

The control flow graph is enriched with the determined path data to create a path graph 213. The path graph builder may use code structure based heuristics to identify the hot path if no counter data to calculate path execution frequencies is available. Those heuristics may include but are not limited to the assumption that for "if" statements the "if" block is less probable than the "else" block, or that blocks throwing exceptions are less probable than blocks throwing no exception.

The path graph builder assigns each node of the control flow graph to exactly one path. As a control flow graph of a method has only one entry block, only one path (the hot path) may contain this entry block. All other paths branch of from another path and may end by either join into another path or by a block with no predecessor, i.e. a block that has no predecessor. Therefore, a path that is not the hot path may start at any position of the control flow graph except the entry block In case corresponding counter data is available in the counter repository 205 of the agent, the path graph builder 201 fetches this counter data, uses the counter data to calculate execution frequency data for all nodes of the control flow graph and determines the hot path and other paths based on the execution frequency data.

The created path graph 213 is sent 212 to the counter positioner 202 which calculates an optimized counter position for each identified path, in form of the control flow graph edge of the path in which the counter should be placed. The counter positions are calculated with the optimization goal of overall minimal counter increments. This may be performed by placing counters on those edges of paths that are least shared with other paths. As an example, the counter path graph 215 has a node at the top which belongs to path "0", but this node is also executed with path "1", therefore this node is shared between path "0" and "1". The two nodes in the middle are only executed either with path "0" or path "1" and are therefore not shared.

The path graph 213 is enriched with the counter position data to create a counter path graph 215, which is forwarded 214 to an instrumentor component 204 and sent 216 to a counter semantic calculator 203.

The counter path graph is used by the instrumentor component 204 to create instrumented bytecode 106. In case an instrumented version of the bytecode is already available, but execution frequency data indicated that the hot path assumption used to create this instrumented version of the bytecode is no longer valid, the instrumentor component creates new instrumented bytecode optimized for the current hot path. This new instrumented bytecode may be referred to as re-instrumented bytecode 108.

In addition to the instrumentor component, the counter path graph 215 is also processed by the counter semantic calculator 203, which creates or updates 217 counter records 206 for each counter position identified by the counter positioner. Counter records 206 are stored in the counter repository 205 of the agent and may be used to store data identifying a counter, the position of the counter within the counter path graph, the semantic of the counter (i.e. the allocations that are represented by the counter) and a counter value.

Instrumented bytecode 106 is created by adding code that identifies a counter record 206 and increments the counter value of the identified counter. Executing instrumented bytecode causes counter increments 107.

Figure 3:
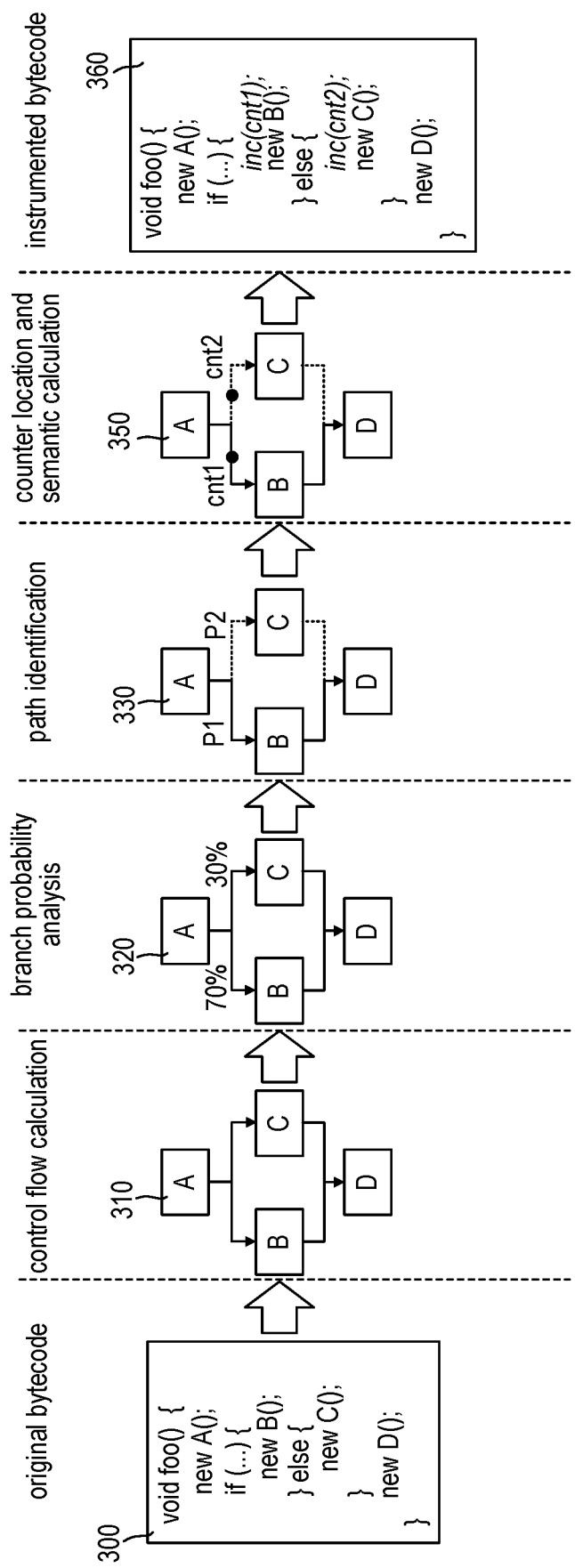

Coming now to FIG. 3 which visualizes the processing stages that are executed by the agent to create instrumented bytecode 106 from original bytecode 105. The processing starts with step 300 which fetches the original bytecode.

It should be noted that the illustrations of step 300 and 360 do not show original bytecode and instrumented bytecode but show original and instrumented source code of a programming language like Oracle Java®. Illustrations showing source code instead of bytecode were chosen because a source code representation is more expressive and better understandable for the reader. The concepts described in FIG. 3 may be applied on bytecode and source code with the same results.

Following step 310 creates a control flow graph 211 that represents the previously fetched bytecode. The illustration of the created control flow graph starts with a node "A" which corresponds to line "new A( )" in the bytecode representation. The evaluation of the condition of the "if ( . . . )" statement (e.g. the code represented by " . . . ") is also part of node "A", as this condition is always evaluated and a branch to one of the alternative successor blocks is performed afterwards. Two outgoing edges connect node "A" with nodes "B" and "C". The outgoing edges represent the "if ( . . . ) {" and "else" statements in the code representation and the nodes "B" and "C" represent the lines "new B( )" and "new C( );". Nodes "B" and "C" are connected with two outgoing edges with node "D" which represents the code line "new D( );". The control flow graph shows that each execution of the received bytecode first executes node or block "A", followed by either "B" or "C" and that after "B" or "C" block "D" is executed.

The subsequent branch probability analysis step 320 determines for each branch in the control flow graph (i.e. nodes with multiple outgoing edges) the probability that a specific outgoing edge is followed. This determination may be based on execution frequency data if it is available, or in case such data is not available may use certain heuristics. More specific and by example of the control flow graph illustration 310, execution frequency data may show that of all executions of the received bytecode, 70% followed the path "A"→"B"→"D" and 30% followed the path "A"→"C"→"D". A possible applicable heuristic for the case of missing frequency data would be the assumption that the execution of an "if" branch is less probable than the execution of the corresponding "else" branch, leading to the result that "A"→"C"→"D" is more probable than the sequence "A"→"B"→"D".

The result of the branch probability analysis is used by the following path identification step 330 to first identify a "hot" or most probable path through the control flow graph and then all other paths. It is noteworthy that only the "hot" path represents a complete path through the control flow graph from the start node of the graph to one of its end nodes, all other paths start at a branch point but do not contain the start node. In the example shown in the illustration, the "hot" path P1 starts with node "A", then executes node "B" and ends after the execution of node "D". The only other path P2 starts at the branch from node "A" to node "C" and ends with the join of the execution into node "D" after the execution of "C".

After all paths through the control flow graph are detected, the following counter location and semantic calculation 350 step is executed to calculate counter placement and semantic data for each identified path. In the illustrative control flow graph, a counter cnt1 for path P1 is located at the branch to node "B" and a counter cnt2 for path P2 is located at the branch to node "C". The semantic of those counters represents the allocations that occur when the counter is incremented. For cnt1, the semantic is an allocation of "A", "B" and "D", and for cnt2 the semantic is "A", "C" and "D" as those allocations occur every time cnt1 or cnt2 are executed.

The calculated counter positions are used by the final instrumentation step 360 that enriches the original bytecode with counter increment calls. In the illustrative instrumented bytecode, the line "inc(cnt1);" in the "if" block corresponds to counter cnt1 and the line "inc(cnt2)" in the "else" block corresponds to counter cnt2.

Figure 4:
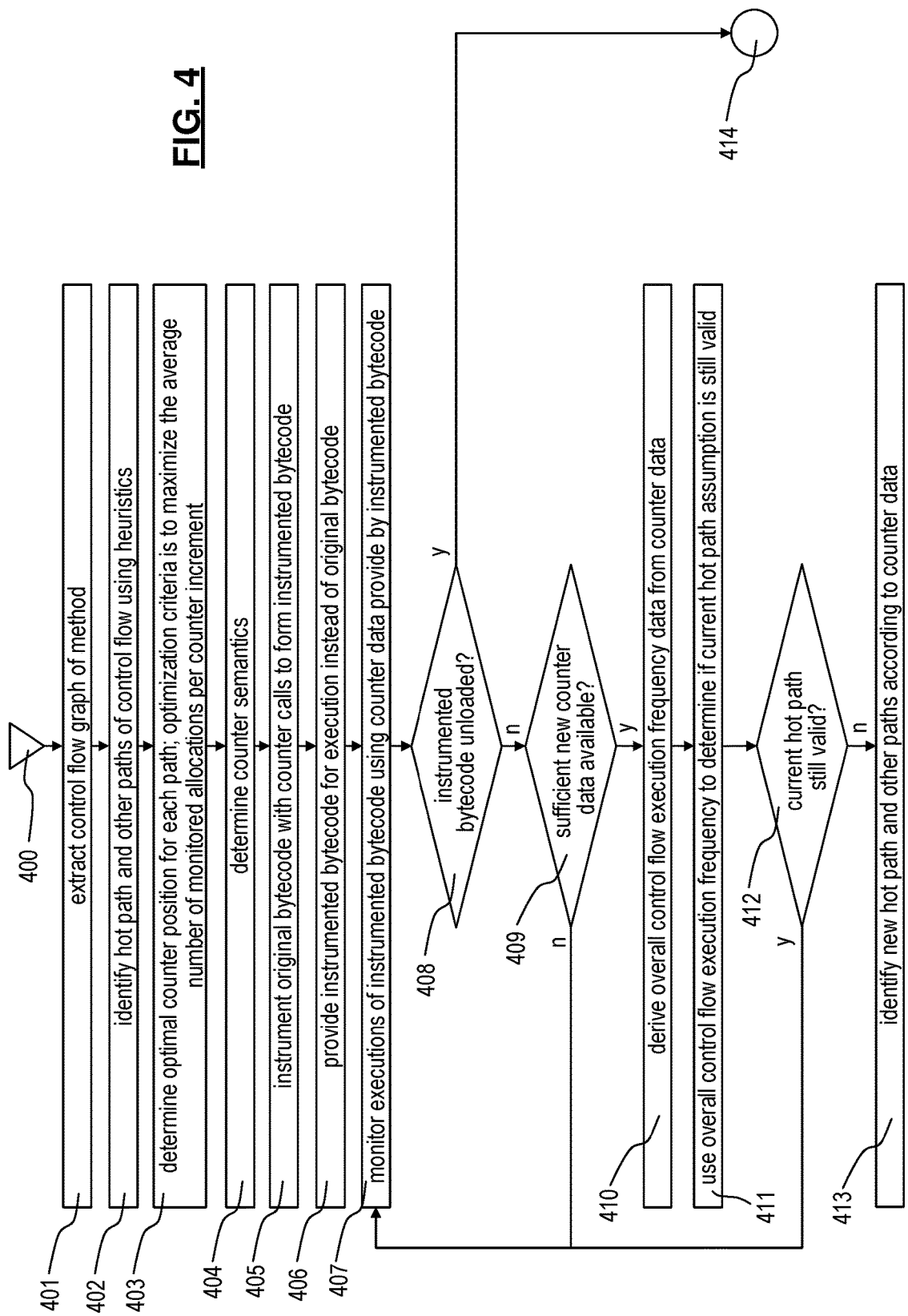

A flowchart describing the instrumentation process, the execution frequency monitoring and re-instrumentation on a change of the "hot" path is shown in FIG. 4.

The process starts with step 400 when the loading of original bytecode 105 is requested e.g. by the execution engine 101. Typically, bytecode is loaded in units of classes and each class may contain multiple methods. A method represents an enclosed sequence of bytecode instructions with one defined entry and one or more exits. The process is executed for each method contained in the original bytecode.

Subsequent step 401 extracts the control flow graph of the currently analyzed method. Extraction of the control flow graph may be performed by sequentially analyzing each bytecode instruction of the method to identify instructions performing jump operations and operations performing arithmetical, logical or other non-jump operations. Sequences of non-jump operations may be represented as nodes in the control flow graph. Jump operations and sequential transitions between nodes may be represented as edges in the graph. A detailed description of this process can be found in FIG. 6.

Following step 402 estimates the most probable path through the control flow graph as "hot" path and based on the "hot" path determines all other paths through the control-flow graph. As there is no execution frequency data available for new loaded bytecode, the path identification uses heuristics that are based on features of the loaded bytecode.

Afterwards, step 403 determines an optimal position for an allocation counter for each path identified in step 402. The optimization goal of step 403 is to minimize the number of counter increments during a single method call. As a consequence, the average number of monitored allocations per counter increment is maximized and the overall number of counter increments is minimized. Step 403 may calculate a share count for each element of the control-flow graph as the number of paths that cause an execution of the control-flow graph and then identify for each path the control-flow graph element with the lowest share count as optimal counter position. A detailed description of the counter positioning process can be found in FIG. 9.

Step 404 calculates the semantic of each counter determined in step 403. The semantic of a counter specifies the allocations represented by the counter. Input for the calculation of the counter semantics are the allocations of control-flow block belonging to the path of the counter and influences of counters belonging to its branch and join path. The counter semantic calculation is described in more detail in FIG. 10.

After counter positions and semantics are calculated, step 405 is executed which transforms the original bytecode into instrumented bytecode by enriching the original bytecode with code that performs counter updates. Counter update code is inserted into the original bytecode according to the optimal positions calculated step 403. The execution of counter update code first identifies and fetches a counter record 206 stored in the counter repository 205 of the agent 104 and then increments the count value 534 of the fetched counter record. In addition to instrumenting original bytecode with counter updates, step 405 may also add corresponding counter records 206 to the counter repository 205. Counter records may next to a count value contain further data describing the counter, like the allocations recorded by the counter. Following step 406 forwards the instrumented bytecode to the execution engine for execution instead of the original bytecode and step 407 start monitoring the executions of the instrumented bytecode using the counter performed updates. The counter update data may be used to report allocations performed by monitored code. Following decision step 408 check if the instrumented bytecode is unloaded by the virtual machine, e.g. because it is no longer required for the execution of the application and may therefore be removed. In case the instrumented bytecode is unloaded, the process ends with step 414. Otherwise, the process continues with step 409 which determines if sufficient new counter data is available for a re-evaluation of the current hot path assumption. Step 409 may e.g. check if the lowest or average counter increments of all counters of the current method, or the counter increments of the hot path of the current method since the last hot-path re-evaluation is above a certain threshold. Exemplary values of this certain threshold include 100, 1000 or 10000 evaluations. In case the threshold is not exceeded, the process continues with step 407.

Otherwise step 410 is executed which uses the recorded counter increments since the last re-evaluation to derive execution frequency data for all elements of the control-flow of the current method. The calculation of execution frequency data is described in detail in FIGS. 12 to 15.

The execution frequency data is used in step 411 to determine if the current hot path assumption is still valid. To determine if the current hot path assumption is still valid, step 411 may e.g. check if the execution frequency data calculated by step 410 indicates that the current hot path is still the path with the highest execution frequency. In this case, the current hot path assumption remains valid and decision step 412 continues the process with step 407.

Otherwise, decision step 412 continues with step 413. Step 413 identifies a new hot path and all other paths according to the current execution frequency data. Afterwards, the process continues with step 403 to perform a re-instrumentation based on the new hot path assumption.

Some execution environments do not provide mechanisms to update the bytecode of a single method, they only provide mechanism to update the bytecode of a whole class containing multiple methods. In such environments, the re-instrumentation process must consider that only one or a subset of the methods of a class may be re-instrumented and e.g. only reset input data for execution frequency calculations for those methods that were re-instrumented.

Referring now to FIG. 5 which shows data structures that may be used to store control-flow graphs, paths and counter records.

Figure 5A:
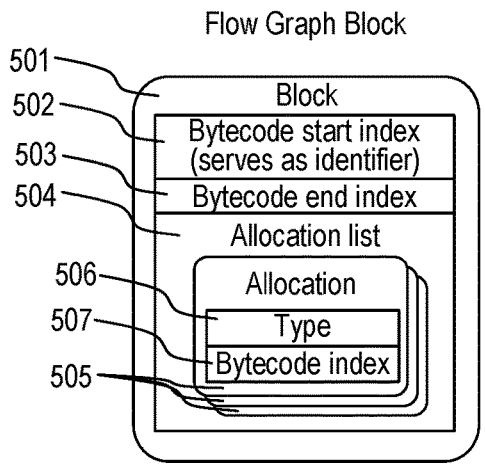

A flow graph block 501 as shown if FIG. 5a may be used to represent a node or block of a control-flow graph and may contain but is not limited to a bytecode start index 502 identifying the first bytecode instruction of the block which may also serve as identifier of the block within the control-flow graph it belongs to, a bytecode end index 503 identifying the last bytecode instruction of the block and an allocation list 504 containing allocation records 505 that describe allocations performed by instructions of the described block 501. An allocation record 505 may contain but is not limited to a type field 506 that may be used to identify the type of object that was allocated and a bytecode index 507 specifying the position of the allocation within the bytecode of a method. The bytecode index 507 of an allocation entry may also be used to determine the position of an allocation in the corresponding source code.

Figure 5B:
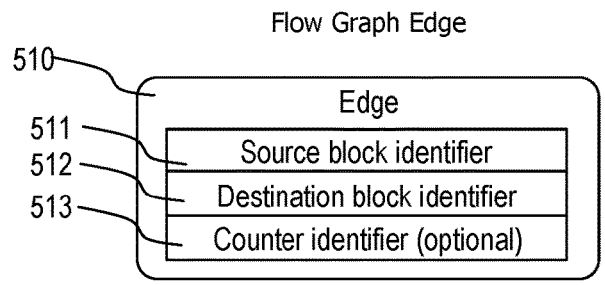

A flow graph edge record 510 as shown in FIG. 5b may be used to represent an edge in a control-flow graph which describes an execution transition from a source block to a destination block. A flow graph edge record may contain but is not limited to a source block identifier 511 identifying the block 501 at which the edge starts, a destination block identifier 512 which specifies the block at which the edge ends and a counter identifier 513 specifying the identifier of the counter associated with the flow graph edge in case a counter should be placed at the edge. The counter identifier may be omitted for edges on which no counter is placed.

Figure 5C:
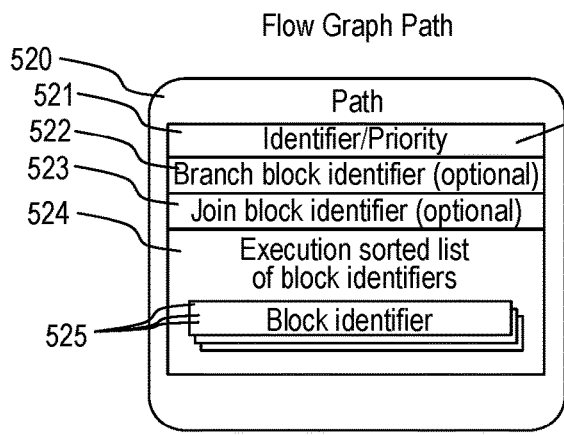

Flow graph path records 520 which are shown in FIG. 5c may be used to represent paths through a control-flow graph and may contain but are not limited to an identifier 521 which identifies a path within its control-flow graph, an branch block identifier 522 which identifies the block 501 at which the path split from another path, a join block identifier 523 identifying the block 501 at which the path joins another path and a list of block identifiers 524 containing block identifiers 525 of blocks 501 of the path in execution order. The identifier of a flow graph path may also describe the execution probability or priority of a path, with a value of 0 indicating the most probable or hot path and with increasing values indicating lower execution probability. Both branch block identifier 522 and join block identifier 523 are optional, as e.g. the path starting with the first or entry block does not branch from another path and paths e.g. ending with a block that returns from the current method do not join another path.

Figure 5D:
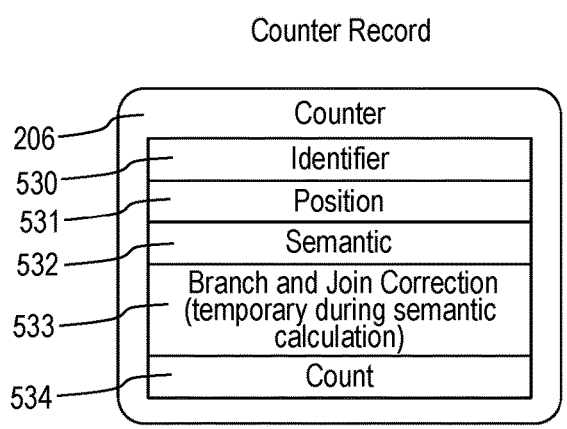

A counter record 206 as shown in FIG. 5d may be used to store data describing an allocation counter. A counter record 206 may contain but is not limited to an identifier 530 which identifies a counter record 206 within the counter repository 205 of the agent and which is used by counter update code of instrumented byte code to identify its corresponding counter, a position field 531 specifying the bytecode index of the counter, a semantic field 532 defining the semantic of the counter in terms of allocations represented by the counter, a branch and join correction field 533 that may be used to temporarily store data describing influences that join and branch path of the current path have on its semantic, and a count field 534 to store the execution count of the counter.

The semantic field 532 may contain for each allocation performed by the path monitored by the counter data describing the type of the allocated object and the position of the allocation, e.g. in form of a bytecode index of the corresponding allocation instruction. It is noteworthy that the semantic field may also contain data describing corrections for allocations counted by paths from which the current path branched or into which the current path joins.

As an example, a first path may perform the allocations "A" and "B", a current path may branch from the first path between "A" and "B", therefore skipping the allocation of "B". The current path may allocate "C". The counter of the first path may be placed before the branch and therefore count allocations "A" and "B" regardless if the current path is executed or not. In case execution branches to the current path, both counters of the first path and the current path are executed, and would without correction report an allocation of "A", "B" and "C". As execution branched from the first path to the current path, the allocation of "B" was not performed. To correct this, the semantic of the counter of the current path may in addition to an allocation of "C" describe a negative allocation of "B" to compensate the incorrect report of an allocation of "B" by the counter of the first path. A detailed description of the counter semantic calculation can be found in FIG. 10.

Coming now to FIG. 6 which provides a flow chart of the process to calculate a control flow graph corresponding to the bytecode of a method. The process starts with step 600 when the control flow extractor 200 receives original bytecode 105 of a method. Following step 601 fetches the first instruction of the received bytecode and marks the bytecode index of the first bytecode instruction as block delimiter. The bytecode of a method consists in a sequence of bytecode instructions and the bytecode index of an instruction represents the position of the instruction within this sequence. Marking a bytecode index as block delimiter may be performed by adding the index to a list of block delimiter indices.

Afterwards decision step 602 checks if a next bytecode instruction is available. In case it is available, step 603 is executed which fetches the next bytecode instruction form the bytecode sequence. Following decision step 604 analyzes the fetched bytecode instruction and determines if it is a jump instruction. In case it is no jump instruction the process continues with decision step 611 which determines if the instruction is an allocation instruction. In case the instruction is no allocation, the process continues with step 602 to analyze the next bytecode instruction. In case the instruction is an allocation, step 612 is executed which determines the type of allocated object and marks the bytecode index as allocation of that type. Typically, an allocation instruction is parameterized with the type of an object that should be allocated and the allocation instruction reserves the amount of heap memory that is required to store an object of the received type. This object type is herein also referred as allocation type. Marking a bytecode index as allocation may be performed by adding a tuple containing the index of the allocation instruction and the allocation type to an allocation list. After step 612 the process continues with step 602 to analyze the next bytecode instruction.

In case step 604 determines that the current bytecode instruction is a jump instruction, step 605 is executed which marks the bytecode index of the jump instruction as block delimiter. A jump instruction transfers the execution to another position and terminates the current sequential instruction execution which also ends the current control flow block.

Following step 606 determines the jump targets of the jump instruction. Different variants of jump instructions have different numbers of jump targets. Unconditional jumps have one jump target to which the execution is always transferred, conditional jumps evaluate an expression and only transfer the execution to the jump target if the result of the evaluation has a specific value. Otherwise, the execution continues after the conditional jump expression. Some jump instructions, like "switch" instructions allow to specify multiple jump targets with one jump instruction.

Following step 607 selects those jump targets that indicate a jump into the currently analyzed bytecode. Other jump targets would transfer the execution to a bytecode sequence that is outside of the currently analyzed bytecode which should not be represented in the control flow graph of the currently analyzed bytecode. Examples for instructions that transfer the execution to a position outside the analyzed bytecode are "return" instructions that exit the current method and return to the caller method and "throw" instructions that throw an exception and cause a transition of the execution to code that handles the thrown exception which is typically also outside the analyzed bytecode.

Step 608 afterwards marks the bytecode indices of the jump targets selected in step 608 as block delimiters. A jump target index represents an index to which execution is transferred to start a new execution sequence. Therefore, a jump target starts a new block of the control flow graph. Following step 609 creates flow graph edges 510 for each selected jump target and sets the source block identifier 511 to the index of the jump instruction and the destination block identifier 512 to the index of the corresponding jump target.

Step 610 analyzes for each selected jump target if its predecessor bytecode instruction is an unconditional jump. In case the predecessor of the jump target is an unconditional jump to a different position than the index of the jump target, the index of the jump target cannot be reached by the execution of the instruction with a bytecode position directly before the jump target. In case the predecessor bytecode instruction is no unconditional jump, the jump target index can be reached after the execution of its predecessor bytecode instruction. As the jump target can be reached from its direct predecessor bytecode instruction that belongs to a block ending with this predecessor instruction, a flow graph edge 510 is created for those jump targets with a predecessor instruction that is not an unconditional jump, its source block identifier is set to the byte code index of the predecessor instruction and its destination block identifier is set to the index of the jump target. Afterwards, the process continues with step 602 to determine if a next bytecode instruction is available. In case no next bytecode instruction is available, the process continues with step 613 which creates control flow graph blocks 501 for the detected block delimiters and allocations.

Step 613 starts with the first two block delimiters and creates a block 501 using the first of the two delimiters for the bytecode start index 502 and the second delimiter for the bytecode end index 503. Afterwards, allocations with a bytecode index between start and end index are fetched, corresponding allocation records 505 are created and stored in the allocation list 504 of the created block. Step 613 creates a block for each recorded block delimiter pair. Step 614 selects those created control flow graph edges with a source block identifier pointing to the end index of a block and changes the source block identifier to point to the start index of the block. Such control flow graph edges were created by step 609 and 610 which created edges from a jump (end of a block) to a jump target (start of a block), because at this point the start index of the block that is ended by the jump instruction is not known. The process then ends with step 615.

Following section describes the mapping of specific control flow structures to a control graph.

Forward Jumps

Jump instructions always are the last instruction of the block they belong to, i.e., the origin block, because they cause the control flow to jump to another block. We therefore close the working block whenever we encounter a jump instruction. They also create an edge from the working block to the jump successor, i.e., the block that starts at the index targeted by the jump instruction. In the case of forward jumps the targeted index is higher than the current index, i.e., the iteration has not reached the index yet. We handle jump instructions by closing the working block. The jump instruction's index becomes the working blocks end index. In order to connect the block to its successors we parse the target index. We then check the block map for this index. If the index is marked as unvisited we create a new block starting at this index. We also mark the block map accordingly, as block start. If the index is marked as block start then we already handled another forward jump to this index. The targeted block therefore already exists. Either way, we connect the working block and the target block. Connecting the jump target is the last step of handling unconditional jumps because they always execute a jump. Conditional jumps, however, do not always execute a jump. If their condition check fails, execution continues at the sequential successor. We therefore have to check the block map at the index of the following instruction. Just as before, this index is either unvisited or contains a block start. If it is unvisited, we create a new block at this index and mark the block map accordingly. If it is marked as block start, a previous jump instruction has already created a block for this index. Either way, we connect the working block and this block, i.e., its sequential successor. Connecting the working block's successors concludes the handling of jump instructions. Unconditional jumps always have one successor, the jump target. Conditional jumps always have two successors, the jump target and the sequential successor. However, there are cases where the jump target and the sequential successor are identical, e.g., if( . . . ) { }. In these cases the control flow graph only shows a single edge between the origin block and the target block. This is correct in the sense that the control flow can only reach the target block when it leaves the origin block. It can, however, reach the target block in two different ways, i.e., by either executing or not executing the jump. It assumes that an edge is either a jump or a sequential connection. Fortunately, identifying these cases is simple. If we know the index of a jump instruction, we also know the index of its sequential follower. We identify these cases by checking if jump target and sequential follower are equal.

Switches

For the purpose of building the control flow graph, switches are forward jumps with multiple targets. Switch instructions do not have a single jump target index. Instead they encode a table of key value pairs. The values in the table are jump target indices. During execution, switch instructions us their provided parameter as key. They then cause a jump to the target index mapped to this key in their table. The two existing types of switch instruction only differ in how they use the keys to access the values in the table. The tableswitch instruction maps one key to one value. The parameter is used as an index to directly access the value. The lookupswitch instruction maps key ranges to one value. The parameter has to be compared to every range to access the value. In addition to the table, switch instructions also contain a default target index. If the provided parameter does not match any of the table's keys then the switch statement causes a jump to this default target index. Handling a switch instruction is similar to handling an unconditional jump. The switch instruction becomes the last instruction of the working block and closes the working block. Instead of one target index, we have to handle every target index in the table as well as the default target index. We connect each of these targets to the working block. Since a switch instruction always causes a jump, we do not connect the working block's sequential successor.

Backward Jumps

So far, we assumed that every handled jump targets an index higher than the current index. Consequently, these jumps either target unvisited instructions or block starts. This is different for jumps that target indices lower than the currently handled index, i.e., backward jumps. Backward jumps always target indices that are either the start, or part of a closed block. Every block starting before the working block must be closed, otherwise it would still be the working block itself. The working block itself is also closed due to the currently handled (backward) jump instruction. The block map reflects this. If the jump target entry is marked as block start, we handle the backward jump like any forward jump to an existing block. If the jump target entry is marked as handled, then the jump target is part of a block that starts at a previous address. Since, per definition, a block can only be entered at its block start, we have to split the block containing the jump target, i.e., the base block.

Returns and Throws

Unlike jump instructions, return and throw instructions do not just redirect control flow to a designated index within the method. Return instructions terminate the method, i.e., control flow leaves the method's bytecode. Throw instructions throw a new exception. This causes the control flow to continue at a handling catch block. The VM determines the handling catch block at run time, by checking the methods on the call stack. It first checks if the throwing method has a suitable catch block, if not it continues at its caller and so on. This means that control flow may leave the method after a throw instruction is executed. We therefore treat them like return instructions, i.e., assume that the throw instruction terminates the method. In cases where the handling catch block is in the same method, our default catch block handling correctly represents the control flow. Handling return and throw instructions is similar to handling unconditional jump instructions. The return or throw instruction becomes the last instruction of the working block, and we close the working block. However, return and throw instructions cause control flow to exit the method. The closed working block therefore does not have any successors within the method.

Exception Catch Blocks, JSR and RET

Java's exception handling poses a problem for our control flow graphs. Up to this point, we have assumed that control flow enters a method at a single point of entry, i.e., the first instruction of the method. The block starting at this instruction is the methods entry block. It then traverses the bytecode until it reaches a return instruction or throw instruction. This assumption is broken by catch blocks. Catch blocks are sequences in a methods bytecode that cannot be reached by the regular control flow of a method. Instead, every method has a table containing the index of the first instruction of every catch block. In addition, this table contains information which exceptions each particular block handles. When an exception occurs the JVM checks this exception table. It then directs control flow to the first instruction of the handling catch block. Adding these catch blocks to the control graph does not require specialized handling. Since the catch blocks are part of the method's bytecode we detect them in the same way we detect any other block. Each catch block creates a subgraph that cannot be reached from the main method graph. This is accurate because catch blocks are only executed in case an exception occurs. We keep track of the entry blocks for these unreachable subgraphs. These entry blocks are starting points for paths during the subsequent path building process. The main graph may be reachable from each catch block subgraph because control flow can return to the main method after a catch block has been executed.

In earlier versions of Java, the instructions jsr (jump to subroutine) and ret handled finally blocks. As the name implies they create a subroutine, i.e., a method within a method. Although these instructions are deprecated they still occur at times. The jsr instruction performs an unconditional jump to a given target index. Before jumping it places the index of the following instruction on the operand stack. Its original purpose was entering finally blocks. The jsr instruction is paired with the ret instruction. The ret instruction expects a target index on top of the operand stack, i.e., the index the jsr instruction placed there. It therefore pops the top value from the operand stack and jumps to it. The purpose of this instruction pair was to make a subroutine reachable from different locations in the method. Once the subroutine was executed, control flow would then return to the location from which it was "called" instead of a statically fixed location. Creating the control flow graph for method's with jsr and ret instructions used for their initial intention is possible. However, jsr and ret instructions are also used by code obfuscaters to obscure a method's control flow. Since the jsr instruction places the return address on the operand stack, it can be replaced or removed by other instructions before a ret is called. Breaking code obfuscation is not within the scope of this work. We therefore assume that any occurrence of jsr and ret behaves as originally intended, i.e., jumps to a subroutine and returns back to the instruction after the jsr. This assumption makes handling jsr and ret simple. We treat jsr instructions as an instruction that does not affect control flow. We treat ret instructions the same as return instructions, i.e., assume that they cause control flow to leave the method. Subroutines are only reached by jsr jumps and cannot be reached by regular control flow. This leads to subroutines becoming disconnected subgraphs, just as catch blocks. Unlike catch blocks, however, subroutines are always completely disconnected from the main graph, i.e., the main graph is never reachable from a subroutine. This correctly represents the original intention of jsr and ret, i.e., creating a method within a method.

Figure 7:
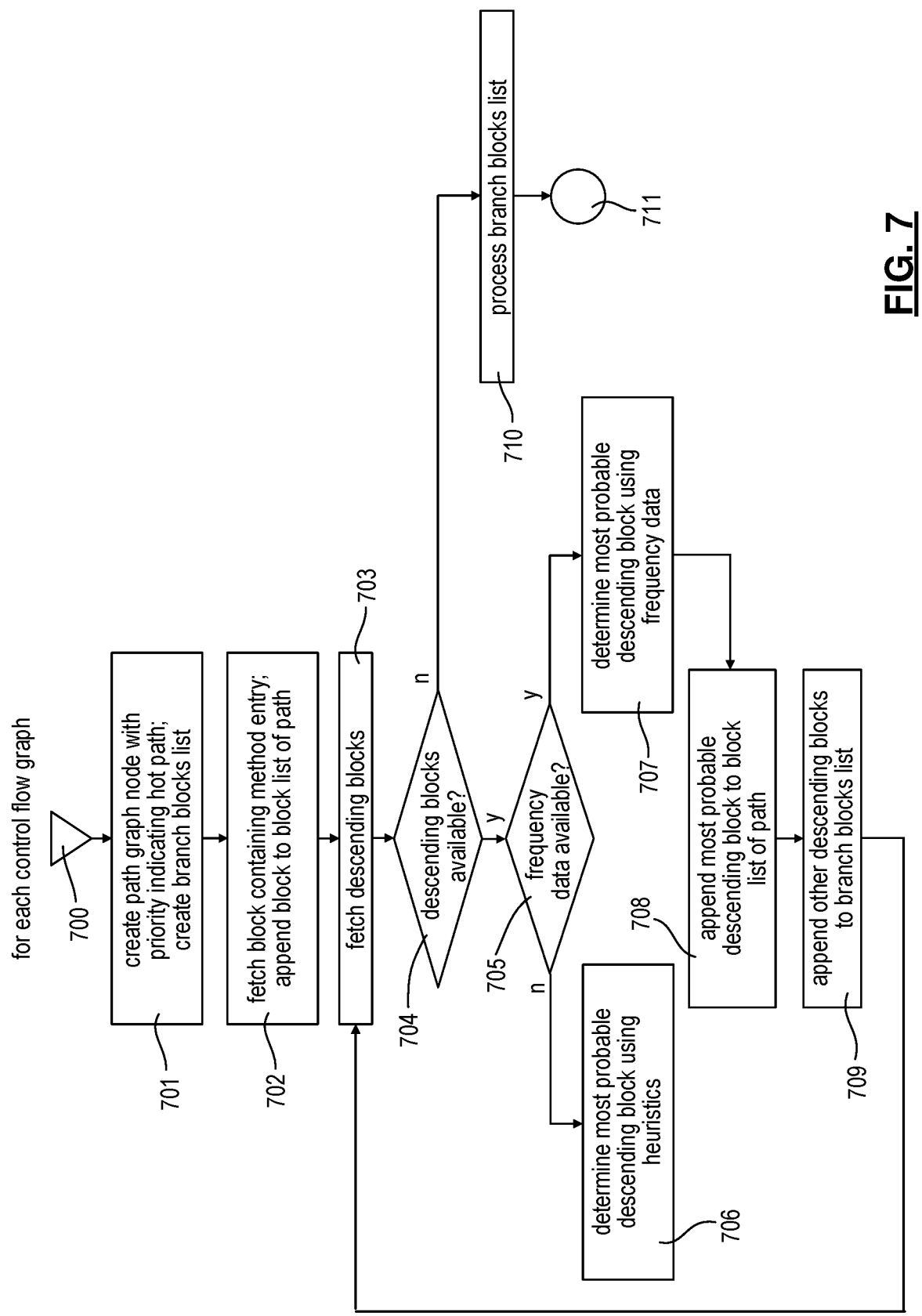

Referring now FIG. 7 which provides a flow chart of the process to identify the most probable execution path through a control flow graph. The process starts with step 700 when a control flow graph of a method is received. Following step 701 creates a flow graph path record 520 and sets its identifier/priority field 521 to a value indicating the hot or most probable path. A value of 0 may be used to indicate the hot path. Subsequent step 702 fetches the block of the control flow graph that contains the method entry. The method entry is always executed when a method is executed, therefore the block containing the method entry always belongs to the hot path. To find the block with the method entry, the control flow graph may either be queried for a block without a predecessor block, or for a block with a start bytecode index of 0. The block containing the method entry is appended to the block list 524 of the earlier created flow graph path record.

Following step 703 fetches the descending blocks of the current block by identifying those blocks that are connected to the current block with a control flow edge going out of the current block. Decision step 704 checks if descending blocks are available. In case descending blocks are available, decision step 705 checks if execution frequency data is available. In case no frequency data is available, step 706 is executed which determines the most probable descending block using heuristics. Otherwise, step 707 is executed which uses execution frequency data to determine the most probable descending block. After step 706 or 707 step 708 is executed which appends the most probable descending block to the block list 524 of the flow graph path 520 created in step 701. The other descending blocks are added to a branch block list for later processing. After step 709, the process continues with step 703 which fetches the descending block of the block identified in step 706 or 707 as most probable descending block. In case subsequent decision step 704 determines that no more descending blocks are available, the hot path is finished and the process continues with step 710 to process the branch block list to calculate the other paths through the control flow graph (for details see FIGS. 8*a* and 8*b*). The process then ends with step 711.

Figure 8A:
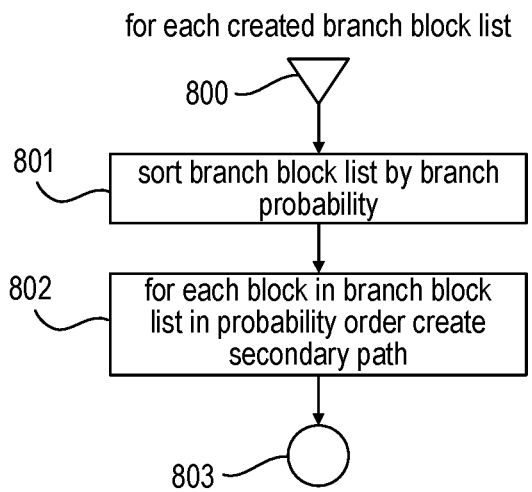
FIGS. 8A and 8B depict a process that identifies all other paths through the control flow of a method besides the most probable path.
Figure 8B:
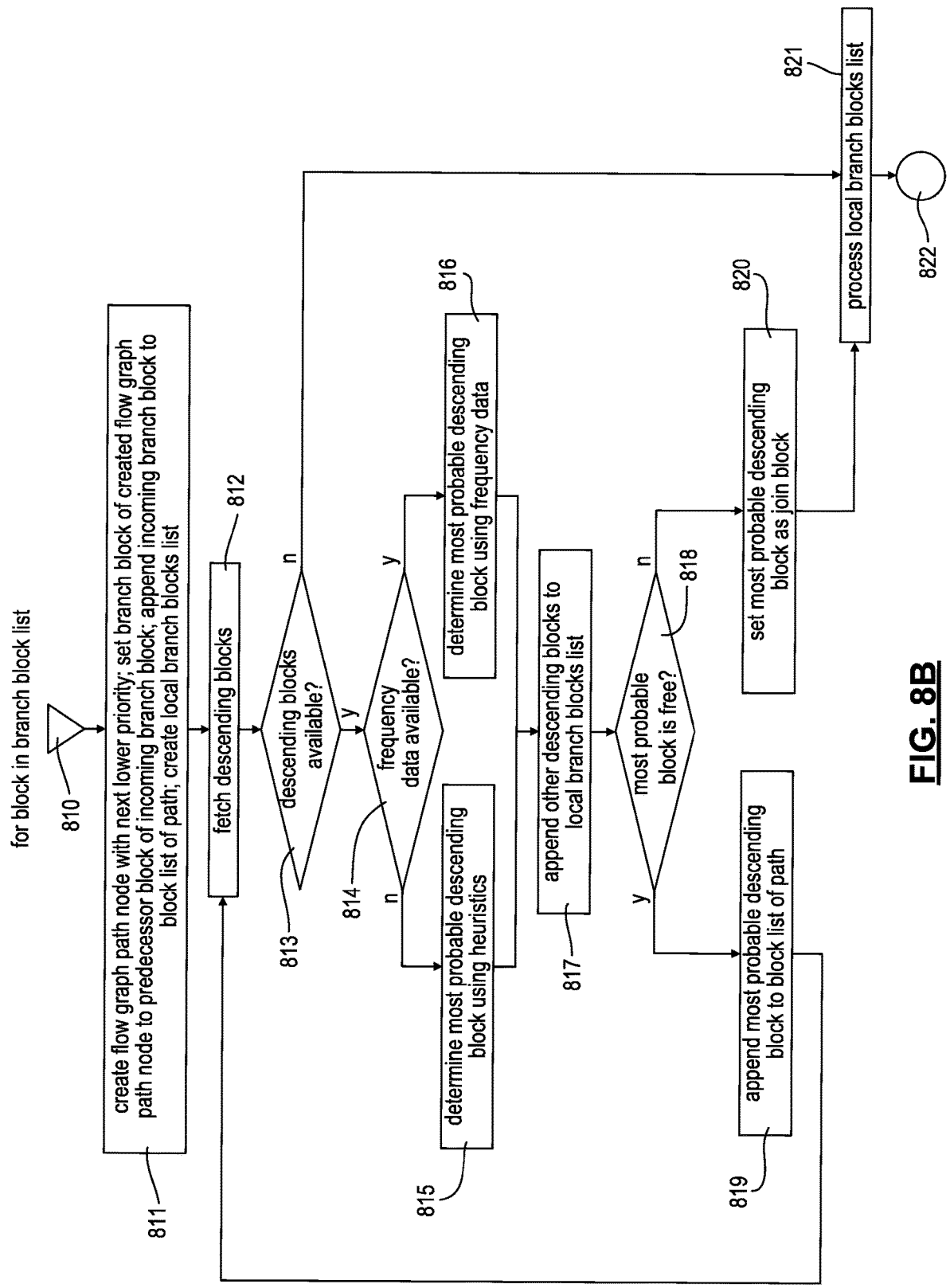

Processes that may be used to create secondary paths after the creation of a hot path are described in FIG. 8. FIG. 8*a* describes the processing of a branch block list as created by the process described in FIG. 7 or the process described in FIG. 8*b*. A branch block list contains blocks that branch of from an already identified path. The process is executed for each created branch block list and starts with step 800 when a new branch block list is received. Following step 801 sorts the branch block list by the branch probability, from highest to lowest branch probability and subsequent step 802 creates a secondary path (for details see FIG. 8*b*) for each branch block, starting with the most probable branch block. The process then ends with step 803.

The process of creating a secondary path is described in FIG. 8*b*. The process is executed for each block in each branch block list and starts with step 810 when a branch block is selected for processing. Following step 811 creates a flow graph path 520 and sets its identifier/priority to the value indicating the next lower priority. Flow graph paths may be assigned incrementing identifiers, with higher values indicating a lower priority or execution probability. Step 811 further determines the branch block identifier 522 for the created flow graph path by first fetching the predecessor blocks of the incoming branch block, selecting the predecessor block which belongs to the path from which the currently analyzed path branched and setting the block identifier 522 of the created flow graph path 520 to the identifier 502 of the selected predecessor block. To ease the selection of the correct predecessor block, a branch block list may not only contain data describing the branch blocks of a path but also an identifier of the path for which the branch block list was created. To identify the correct predecessor block, step 811 may select the predecessor block of the incoming branch block that belongs to the path that has an identifier equal to the path identifier stored in the branch blocks list.

The incoming branch block is appended to its block list 524 of the created flow graph path 520. Afterwards, a local branch blocks list to store the branch blocks of the currently created path is created.

Following step 812 fetches the descending blocks of the current block (i.e. the incoming branch block) and subsequent decision step 813 determines if descending blocks are available. If no descending blocks are available, the current path is finished and the process continues with step 821 to process the local branch blocks list (see FIG. 8*a*). The process then ends with step 822. In case descending blocks are available, steps 814, 815 or 816 and 817 are executed which determine the most probable descending block either using execution frequency data or heuristics and add other descending blocks to the local branch blocks list, identical to steps 705, 706 or 707 and 709 of the process described in FIG. 7. After the most probable descending block is identified, decision step 818 check if this block is free. The block is free if it does not already belong to another, earlier identified path. In case the block is free, it is appended to the block list in step 819 and the process continues with step 812 to fetch the next descendant blocks. In case step 818 detects that the most probable descendant block is not free, its identifier is set as the join block identifier 523 of the created flow graph path by step 820. With the identification of its join block, the current path is finished the process continues with step 821 to identify further paths using the branch blocks stored in the local branch block list. The process then ends with step 822.

Following section describes additional details of the path graph creation process.

Looping Path Handling

We detect loops during path building when the currently built path, i.e., the detecting path, chooses a successor block that already belongs to the path. We call this block the header block of the detected loop. The looping path segment following the header block is the detected loop's body.

We handle these loops by branching off the loop's body into a separate path, the lasso. However, lassos may contain unhandled branching blocks from which other paths may branch off from. We created these unhandled branching blocks when the lasso was still part of the detecting path. Since the detecting path itself is unfinished we postpone handling these branching blocks. We add any lasso split off from the detecting path to a list. We handle the entries in this list once the detecting path is finished. The header block is now the detecting path's tail block. We continue building the detecting path as before by choosing a successor for the header block. The presence of lassos restricts this selection. The detecting path can not pick a block that belongs to one of its lassos as successor. Doing so would cause the detecting path to join a path that branched off from itself. This would make creating a counter for either path impossible. We build path counters in the same order as we created the paths. This should ensure that when we build a path counter, any other path counters required are already finished. Lassos break this assumption. They are created after the detecting path, but before the detecting path is completed. Their counters, however, are created after the detecting path's counters. If the detecting path would be allowed to join its own lasso, we therefore could not create either counter. Each counter would require the other to be created first. We therefore introduce another invariant. A detecting path can never choose a successor that is part of one of its lassos. This ensures that counters can be constructed for sequential as well as looping control flow. The restriction on possible successors can lead to situations where a path's tail block only has successors belonging to lassos. Since every successor is therefore invalid we have to end the path. In these cases, we still have to ensure that the edges from the tail block to the invalid successors are assigned to a path. The tail block therefore becomes the last open branching block of the path. When this open branching block is handled, it creates empty paths to all invalid successors. Splitting off lassos and restricting the possible successors are the only changes required to the path building process. Once we complete the detecting path we handle its open branching blocks. We also handle the open branching blocks of its lassos, like any other open branching blocks. The resulting side paths are not restricted in their choice of successors since they are created after the detecting path is finished.

Figure 9:
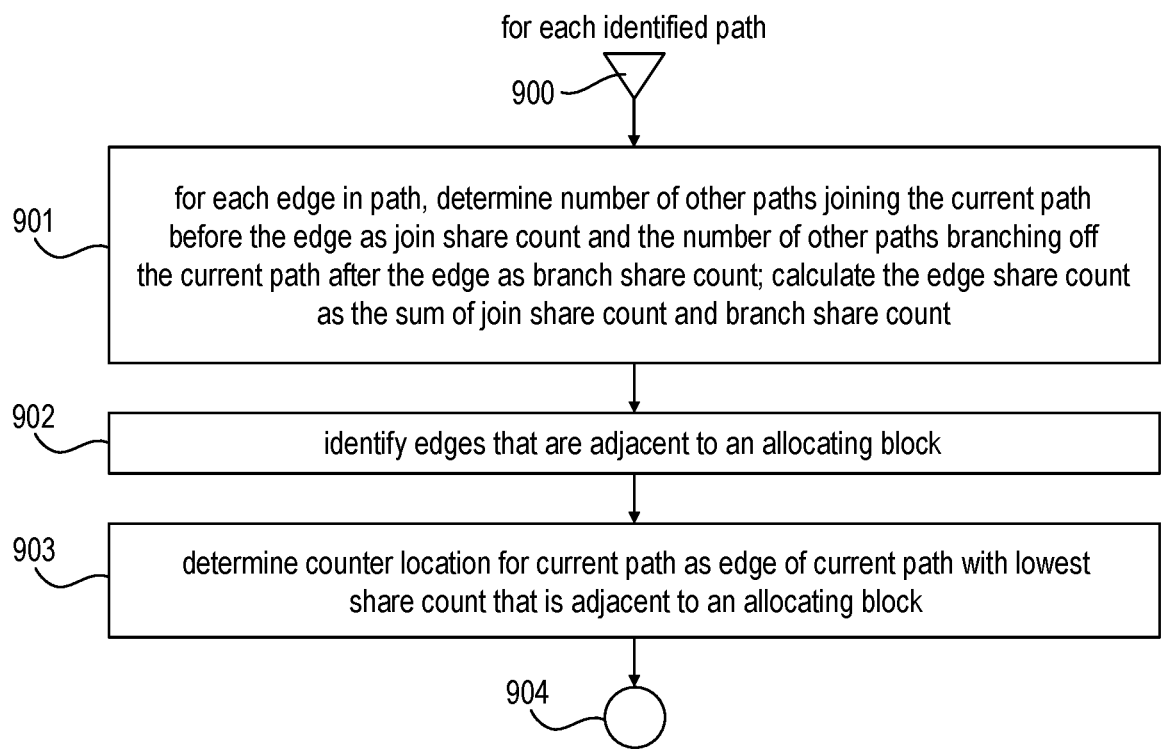
FIG. 9 shows a process that finds an optimal location for an allocation counter within the edges of a single execution path.

Coming now to FIG. 9 which shows the flow chart of a process that may be used to identify optimal counter locations for identified paths through a control flow graph. The process is executed for each identified path and starts with step 900 when a new path is received for which a counter position should be calculated. Subsequent step 901 identifies for each edge of the current path the number of other paths that join the current path before the edge and the number of other paths that branch from the current path after the edge. The paths joining before or branching after the edge also cause an execution of the edge, therefore the edge is "shared" with those paths. The sum of paths joining before and branching after the edge is referred to as "share count" of the edge. It is desired to place a counter at the edge with the lowest share count, as this is the most unique edge of the path and placing counters at edges with the lowest share count helps to decrease the average counter increments per method execution, in the best case to one counter increment for each allocating method execution.

Calculating the share counts of edges may be performed by first initializing the share count of each edge of the control flow graph with the value 1. Afterwards, the identified paths of the control flow graph are processed sequentially by iterating over the blocks of the paths and processing detected branch and join blocks of each path.

Whenever a branch block is detected (i.e. a block with more than one outgoing edge) then the share count of all edges of the path that are preceding the branch block is increased by the number of branching off paths (i.e. number of outgoing edges of the path minus one as one outgoing edge belongs to the currently processed path). The share count of preceding edges of the predecessor paths of the currently processed path is also increased by the number of branching off paths.

When a join block is detected (i.e. a block with more than one incoming edge) then the share count of all edges of the path that are succeeding the join block are increased by the number of joining paths (i.e. the number of incoming paths minus one). The share count of the succeeding edged of the successor paths of the currently processed path is also increased by the number of joining paths.

After the share count of every edge is determined, step 902 is executed which selects those edges that are adjacent to an allocating block as edge candidates for counter placement. The process described in FIG. 6 creates the whole control flow graph of a method. This control flow graph may also contain blocks that perform no allocations. Placing a counter in an edge that connects two blocks that perform no allocation is not desired, because it increases the likelihood that other paths have to correct this counter because the counter assumes that all of its allocations will be reached eventually, or have been reached on the way to the counter. Placing the counter adjacent to one of the path's allocating blocks reduces the probability that other counters having to correct because the adjacent allocation(s) are reached via the edge the counter is placed on. When no edge with an adjacent allocating block is found, the currently analyzed path performs no allocation. As the path performs no allocation, there is also no counter placed in it.

Following step 903 selects the edge with the lowest share count from the edge candidates identified by step 902. The process then ends with step 904.

Coming now to FIG. 10 which shows the flow chart of a process that calculates counter semantics for counters of paths through a control flow graph. The counter semantic calculation for a method is performed after the positions for the counters of all paths through the control flow graph of the method are calculated and corresponding counter records 206 are available.

The process is executed for each identified path and starts with step 1000 for a path for which the semantics of its predecessor and successor paths are already calculated. The predecessor path of a given path is defined as the path from which the given path branches and the successor path of the given path is defined as the path into which the given path joins. As the hot path has no predecessor and successor per definition, semantic calculation may start with the hot path.

Following step 1001 determines the allocations performed by the current path, e.g. by selecting all allocation records 505 of all blocks 501 referred in the block list 524 of the currently processed flow graph path and by setting the semantic field 532 of the corresponding counter record 206 to a value representing the allocations performed by the path.

The semantic field 532 of a counter may be used to represent allocations performed by the path corresponding to the counter and corrections of allocations counted by counters of other paths that are not performed when the current path is executed.

Allocation corrections may contain positive and negative allocation counts, as counters of branch or join path of a current path may be skipped in case the current path is executed and allocations performed by those paths are incorrectly not counted. This may be corrected by positive allocation count corrections. In case counters of branch or join path of a current path are executed, they may incorrectly count allocations that are not performed when the current path is executed. This may be corrected by negative allocation count corrections.

To represent both allocation and correction data, some embodiments may provide semantic fields 532 that contain a list of positive allocations and a list of negative allocations, both lists containing allocation records 505.

In such embodiments, step 1001 may add the allocation records describing the allocations of the current path to the list of positive allocations.

Following step 1002 determines the position of the counter of the predecessor or branch path in relation to the location of the branch that started the current path and subsequent decision step 1003 checks whether the counter position of the predecessor path is before or after the branch. In case the predecessor counter is placed before the branch to the current path, which indicates that the predecessor counter is executed with the current path, step 1004 is executed. Step 1004 determines those allocations that are incorrectly counted by the counter of the predecessor because they are not performed in case the current path is executed. Those allocations include all allocations counted by the predecessor counter that occur after the branch to the current path. This contains allocations of the predecessor path performed after the branch, and allocations contained in the join correction of the predecessor path, i.e. corrections of the predecessor path to compensate counts of the path into which the predecessor joins.

Step 1004 may negate the identified incorrect allocations and add them to the branch portion of the branch and join correction field 533 of the counter corresponding to the current counter. The branch and join correction field 533 may contain lists for positive and negative branch corrections and lists for positive and negative join corrections. Negating the identified incorrect allocations and adding them to the branch correction lists may be performed by adding those identified allocations of the predecessor counter that are in a positive allocation list to the negative allocation list of the current branch correction of the current counter and vice versa.

In case step 1003 determines that the counter of the predecessor path is located after the branch to the current path and the predecessor counter is not executed with the current path, step 1005 is executed which identifies those allocations that are performed in case the current path is executed but that are not counted because the counter of the predecessor path is not executed. Those allocations include allocations of the predecessor path that occurred before the branch to the current path and the allocations contained in the branch correction of the predecessor path. Those allocations are added to the branch portion of the branch and join correction of the current path.

Step 1006 is executed after step 1004 or 1005 and determines the position of the counter corresponding to the successor path in relation to the position of the join of the current path into its successor path. Subsequent decision step 1007 determines if the position of the counter corresponding to the successor path is before or after the join of the current path and in case the successor counter is before the join, continues the process with step 1008. If the successor counter is located before the join, it is not executed in case the current path is executed and step 1008 identifies those allocations that were performed but are not counted by the successor counter because it is not executed. Those allocations contain the allocations performed by the successor path after the current path joined into it and the join correction of the successor path. Those allocations are added to the branch and join correction field 533 of the counter corresponding to the current path.

In case the counter of the successor path is located after the join which means that the counter of the successor path is executed with the execution of the current path, step 1009 is executed which identifies those allocations that were counted by the counter of the successor path which are not performed in case of the execution of the current path. Those allocations are all allocations of the successor path that are located before the join and all allocations of the branch correction of the current path. Those allocations are negated and added to the join portion of the branch and join correction 533 of the counter of the current path.

After step 1008 or 1009 step 1010 is executed which calculates the semantic of the current counter as the sum of the allocations of the current path and the calculated branch and join correction.

Calculating the sum of those allocations may be performed by appending the positive allocations of the branch and join correction to the positive allocation list of the semantic field and appending the negative allocations of branch and join to the negative allocations list of the semantic field. Allocations that are contained in both positive and negative allocation list of the semantic field may be removed from both lists.

The process then ends with step 1011. After the counter semantics of all paths of a method are calculated, the value of branch and join correction field 533 of the corresponding counters is no longer needed and may be cleared. It is noteworthy that some paths may have no predecessor or successor path (e.g. the hot path). In this case, the steps to calculate the corresponding branch correction (e.g. step 1003, 1004 and 1005) or join correction (e.g. step 1007, 1008 and 1009) may be omitted.

As each counter increment represents multiple positive or negative memory allocation according to the calculated semantics of the counters, a counter value interpretation or transformation process that uses the calculated counter semantics to calculate the memory allocations corresponding to a given set of counter values. This interpretation process may in some embodiments be performed by the agent 104 and the allocation monitoring data 110 created by the agent already contains data describing performed allocations. In alternative embodiments, the agent 104 may send calculated counter semantics to the monitoring server 120 and subsequently send allocation monitoring data that only contains the recorded counter updates. In those alternative embodiments, the monitoring server may use received counter data and counter semantics to calculate the corresponding memory allocations.

Referring now to FIG. 11 which visualizes the four basic variants of counter semantic correction by a simple example. The figure is divided into four quadrants, each quadrant showing the same configuration of a current path and its predecessor and successor path but with different location of the counter of the predecessor and successor path in relation to the branch and join position of the current path.

The predecessor path (solid lines) contains allocation "A" 1101 and "B" 1102 before the branch point 1120 and allocation "C" after the branch point. The current path (dash-dotted lines) branches 1120 from the predecessor path between allocation "B" and "C", performs allocation "D" 1104 and joins 1121 the successor path between allocation "E" 1105 and "F" 1106. The successor path (dashed lines) performs allocation "E" 1105 before the join point 1121 and allocations "F" 1106 and "G" 1107 after the join point.

The allocations performed by the current path are independent of the positions of the counter of predecessor and successor path. They consist in the allocation "D" 1104 in all quadrants.

The upper left quadrant shows a situation with predecessor counter 1110 located before the branch point 1120 and successor counter 1112 located before the join point 1121. In this case, the counter 1110 of the predecessor path is executed and counts the allocation "A", "B" and "C". In case the current path is executed, the execution diverts from the predecessor path after the execution of its counter and before allocation "C" is performed. To correct this, the branch correction of the current counter is "−C" (see legend 1131).

The counter 1112 of the successor path is before the join point 1112, therefore it is not executed with the current path. The counter for the successor path would count allocations "E" 1105, "F" 1106 and "G" 1107. Allocation "E" is situated before the join point and is therefore not performed with the current path, whereas "F" and "G" which are after the join point are performed when the current path is executed. Therefore, the join correction for the current path is "F" and "G". The semantic of the current counter as combined by the allocations of the current path and its branch and join correction is "–C" (from the branch correction), "D" (allocations of current path), "F" and "G" (from the join correction).

The calculated semantic for the current counter may be verified by checking that the allocations performed in case the current path is executed are identical with the allocations reported by the counters executed in this case. The allocations performed when the current path is executed are "A", "B", "D", "F" and "G". In the situation of the left upper quadrant, the counters of predecessor and current path are executed. The predecessor counter records allocation "A", "B" and "C", the current counter records "–C", "D", "F" and "G". the allocations "C" and "–C" cancel each other out and the remaining counted allocations are "A", "B", "D", "F" and "G" as expected.

The situation in the lower left quadrant differs from the one in the upper left quadrant by the position of the counter 1113 of the successor path which is now after the join position 1121. In this scenario, the join correction of the current path must consider that the counter of the successor path is executed which also counts allocation "E" before the join point 1121. Therefore, the join correction is "–E", see legend 1132. The semantic of the current counter is in this situation "–C", "D" and "–E" and the allocations counted by all executed counters are "A", "B", "D", F" and "G" as expected.

The upper right quadrant shows a scenario with the counter 1114 of the predecessor path located after the branch point 1120 and the counter 1112 of the successor path located before the branch point. In this case, neither the counter of the predecessor path, nor the counter of the successor path is executed with the current path. The branch correction contains the executed but not counted allocations of the predecessor path "A" and "B" and the join correction contains the executed but not counted allocations of the successor path "F" and "G". The combined semantic of the current path is "A", "B", "D", "F" and "G" as expected.

The lower right quadrant shows a scenario with the counter 1114 of the predecessor path after the branch point 1120 which is therefore not executed and the counter 1113 of the successor path after the join point which is therefore executed. The calculated semantic of the current counter is "A", "B", "D" and "–E", see legend 1134 and the combined counted allocations by the executed counters of the current path and the successor path are "A", "B", "D", "F" and "G" as expected.

Coming now to FIG. 12 which shows the flow chart of a process that calculates execution frequency data for all elements of the control flow graph of a method using measured execution frequency data that is only available for a subset of the elements of the control flow graph.

The measured execution frequency data may be provided by allocation counters instrumented to the code of the method. It is desired to reduce the number of instrumented allocation counters to a minimum to also reduce the overhead generated by allocation monitoring, therefore measured execution frequency data is typically only available for a small subset of the control flow graph. In most cases, this reduced execution frequency data is not sufficient for the execution frequency based identification of a hot path. Therefore, the structure of the control flow graph and knowledge about the propagation of execution frequency between connected elements of the control flow graph is used to calculate additional execution frequency data until the identification of a hot path is possible.

The process starts with step 1200 when sufficient method executions for a reevaluation of the hot path are recorded for a specific method. The number of method executions required may be manually configured, exemplary values are 10, 50, 100 or 1000 executions. Alternatively, the complexity of the control flow graph of the method (i.e. number of control flow blocks, edges, number of branches or loops etc.) may be used to determine a minimal number of method executions for a reevaluation of the hot path.

The number of method executions may be measured by a separate counter placed at the entry of the method, which counts every invocation. Alternatively, the allocation counters of the method may be monitored, and a minimum, maximum or average counter value may be used as approximation of the method execution count.

Following step 1201 uses a set of trivial control flow propagation rules to recursively calculate additional frequency data for control flow graph elements that are adjacent to control flow graph elements with known execution frequency data. The set of trivial control flow propagation rules may contain but is not limited to "executions entering a block must also leave the block unless the block has no successor", "executions leaving a block must also have entered the block", "the execution count of a block equals the sum of the execution counts of its incoming edges" and "the execution count of a block equals the sum of the execution count of its outgoing edges". The application of those rules on a control flow graph is shown in FIG. 13*b* by example. Step 1201 recursively applies those rules to elements of the control flow graph with unknown frequency data that are adjacent to elements with known frequency data until either frequency data for the whole control flow graph is available or none of the above rules can be applied.

Following decision step 1202 checks if all frequency data of the graph is now known. If all frequency data is available, the process ends with step 1209. Otherwise, the processing continues with step 1203 which recursively uses dominance/post-dominance relationships of control flow blocks to calculate further frequency data. Step 1203 creates a dominance tree and a post-dominance tree of the control flow graph and identifies those blocks that are in dominance and post-dominance relationship. Dominance trees and post-dominance trees of a control flow graph describe dominance and post-dominance relationships between its blocks. A block "sub" is dominated by a block "dom" if block "sub" can only be reached from the method entry by passing through block "dom" first. A block "postdom" post-dominates another block "postsub" if an exit of the method can only be reached from "postsub" after passing "postdom".

Step 1203 identifies pairs of blocks that are both in a dominance and in a post-dominance relationship, where frequency data is only known for one block and propagates the frequency data to the other block. Dominance/post-dominance relationship based frequency data propagation is described by an example in FIG. 14. Step 1203 recursively performs dominance/post-dominance based frequency data propagation until no more pairs of blocks that are both in a dominance and in a post-dominance relationship where frequency data is only known for one block are available. It is noteworthy that dominance/post-dominance propagation can only be applied to blocks that are on the same loop level, otherwise this technique could generate incorrect results. Two blocks are on the same loop level if both contain to no loop, or if they belong to the body of the same loop. As an example, a method may start with blocks A and B, followed by a first loop in which blocks C and D are executed. The first loop may contain a nested loop in which blocks E and F are executed. A second loop may follow the first loop in which blocks G and H are executed. After the second loop block I may be executed. In this example, blocks A, B and I are on the same loop level because they are in no loop. C and D, E and F and G and H are on the same loop level because they are parts of the same loop body.

Afterwards, decision step 1204 is executed which checks if all frequency data of the graph is now known and in this case, ends the process with step 1209. Otherwise, decision step 1205 is executed which determines if the dominance/post-dominance based propagation step provided new frequency data. In case step 1203 calculated new frequency data, step 1201 is executed to further propagate frequency data using trivial propagation rules. This way, trivial propagation and dominance/post-dominance propagation are executed in an alternating way until both techniques provide no more additional frequency data.

In case steps 1201 and 1203 are exhausted, the process continues with step 1206 which uses dominance/post-dominance relationships to calculate execution frequency ranges for blocks with yet unknown frequency data.

An execution frequency range is defined by a minimum and a maximum execution count. The minimum execution count may initially set to 0, as there cannot be less than 0 executions and the maximum execution count may be initialized with a value indicating an unknown execution count.

Step 1206 uses multiple approaches in multiple iterations to calculate execution range values, therefore multiple minimum or maximum execution values may be calculated for the same block or edge. In case a new minimum execution count is calculated for an element of the control flow graph, this new minimum count will only be used if it is higher than the already stored minimum execution count of the element. Similar, a new calculated maximum execution count will only be used if it is lower than the current maximum count, or the current maximum count indicates an unknown value.

Step 1206 uses dominance/post-dominance relationships to propagate maximum values of execution frequency data from given blocks to blocks that are dominated/post-dominated by the given block, and reverse dominance/post-dominance relationships to propagate minimum execution frequency data from given blocks to the block dominating/post-dominating the given block.

Propagating maximum execution frequency values exploits the fact that executions can only reach a given blocks via the blocks that dominate the given block. If according to the domination tree block "dom" dominates a block "sub" then every path from the method entry to block "sub" passes through block "dom". Block "sub's" maximum frequency value must be less or equal than block "dom's" frequency value, since block "sub" can only be reached by passing block "dom". We can therefore propagate the maximum value of block "dom" downward to all its children, i.e., to all blocks it is directly or indirectly connected to, in the dominator tree.

Minimum execution frequency values are propagated from blocks to their directly dominating block and the propagation process exploits the fact that the minimum frequency of a block must be equal or greater than the sum of the minimum frequencies of the blocks it directly dominates. Therefore, the sum of the minimum frequency of blocks directly dominated by a given block can be propagate to the minimum frequency of the given block.

Propagating frequency range values using post-domination relationships works identically, expect that relations from the post-domination tree are used.

Step 1206 may alternately perform maximum and minimum value propagation based on dominance and post-dominance relationships until no more changes occur e.g. during a complete propagation round.

It is noteworthy that dominance/post-dominance based execution frequency range propagation is restricted to blocks that are on the same loop level.

Following decision step 1207 checks if execution frequency data is available for all elements of the control flow graph. In case all frequency data is available, the process ends with step 1209.

Otherwise, step 1208 is executed which applies trivial control flow rules to propagate and improve frequency range data calculated by step 1206. Like the dominance/post-dominance frequency range propagation, the trivial rule based frequency range propagation is an incremental process that may in a first iteration calculate a specific frequency range for a block or edge which may then be improved in a subsequent iteration, e.g. by setting a higher minimum value and/or lower maximum value to specify a more precise frequency range.

As the precise propagation rules, the range propagation rules are derived from the knowledge that the frequency of a block is equal to the sum of the frequencies of its incoming edges and equal to the sum of the frequencies its outgoing edges. However, since now the input data are not exact frequency values but value ranges, the derived rules are more complex and the number of rules is larger than in the precise case. The rules for the frequency range case may include but are not limited to the rule that the maximum frequency of a block is at most as big as the sum of the maximums of its outgoing (or incoming) edges, the rule that the minimum frequency of a block is least as big as the sum of the minimum values of its outgoing (or incoming) edges, the rule that the maximum value of an outgoing (or incoming) edge of a block can be set to the maximum value of the block minus the sum of the minimum values of it sibling edges (other outgoing/incoming edges of the block) or the rule that the minimum value of an outgoing (incoming) edge of a block can be calculated as the minimum value of the block minus the sum of the maximum values of its sibling edges if those maximum values are known.

The range based propagation rules may repeatedly applied to all elements of the control flow graph with unknown or range frequency data until all required frequency data is known, one iteration (i.e. application of the rules to all elements with not yet precise frequency data) provides no more improvement or until a specific maximum iteration count is reached. An example describing the trivial range propagation process can be found in FIG. 13*b*.

Following section describes above frequency propagation mechanisms in more detail.

Precise Control Flow Graph Propagation

The propagation process loops over a queue of marked edges. At the start, this queue contains all the edges marked during initialization. Each iteration removes the marked edge at the head of the queue and attempts to propagate its value. A successful propagation precisely marks one unmarked block or one unmarked edge. Whenever we mark an unmarked edge we add it to the end of the work queue. This ensures that we handle it later, thereby propagating its value further. Whenever we mark an unmarked block we immediately propagate its value further. The loop terminates when the queue of marked edges is empty. This means that we have exhausted all possible propagation options. Control flow graph propagation is based on four invariants for the control flow through a method.

Invariant I: whenever control flow enters a block, it must also leave the block unless the block does not have successors.

Invariant II: Whenever control flow leaves a block, it must also have entered the block before.

Invariant III: The frequency value of a block equals the sum of the frequency values of its incoming edges.

Invariant IV: The frequency value of a block equals the sum of the frequency values of its outgoing edges.

These four invariants form the basis of our propagation rules. We propagate the value of a marked edge or of a marked block by checking if any of our rules apply. If so we propagate the value by applying our propagation rules. If not then the value cannot be propagated and we continue with the next edge in our work queue.

Precise Dominance Tree Propagation

Dominance trees represent dominance relationships between the blocks of a directed graph. We distinguish two kinds of dominance trees, i.e., dominator tree and postdominator tree. A dominator tree shows how the blocks in a control flow graph dominate each other. A block dom dominates another block sub iff block sub can only be reached from the method entry by passing through block dom first. In other words, if the control flow passes through block sub then it must have passed through block dom first. The dominator tree represents this with a directed edge from block dom to block sub. A postdominator tree shows how the blocks in a directed graph postdominate each other. A block postdom postdominates another block postsub iff the control flow can only reach a method exit point after passing block postsub by passing through block postdom. In other words, if the control flow passes through block postsub then it must pass through block postdom in order to leave the method. The postdominator tree represents this with a directed edge from block postdom to block postsub.

We use this dominate-postdominate relation to establish a new propagation rule. We apply this rule whenever we exhausted our regular propagation options without completely marking the frequency graph. We start by selecting one of our already marked blocks. We then check if there exists another, unmarked block in a dominatepostdominate relation with our marked block. If we find such a block, we mark it with the frequency value of our marked block. We then continue regular propagation from this marked block. If we find no such block we select another marked block and repeat the search. If no dominate-postdominate pair exists, then the precise marking process terminates.

Loops in the control flow graph restrict propagation between dominatepostdominate pairs. Dominance relations do not consider how often each block in a dominate-postdominate relation is passed during one execution. As long as the dominating/postdominating block is passed at least once the relation holds. This causes a problem for our use of these relations as it causes incorrect frequency values. To prevent this kind of error, we check if either block is part of a loop by traversing every possible path originating from the block. If we encounter the block itself on one of these paths then the path is a loop. We only propagate between two blocks if neither block is part of a loop or if both blocks are part of the same loops.

Range Dominance Tree Propagation

We already established that in order to propagate precise frequency values between two blocks, the blocks must be in a dominate-postdominate relation. For the purpose of range marking we can now exploit additional properties of dominance trees. These properties do not require a dominate-postdominate relation. However, they still require loop checks as described before.

We propagate range values separately, i.e., we either propagate the minimum or the maximum value, not both at once. If a block dom dominates a block sub then every path from the method entry to block sub passes through block dom. Block sub's maximum frequency value must be less or equal than block dom's frequency value, since block sub can only be reached by passing block dom. We can therefore propagate the maximum value of block dom downward to all its children, i.e., blocks it is directly or indirectly connected to, in the dominator tree. If a block dom directly dominates, i.e., has an outgoing edge in the dominator tree to, a block sub then every path from the method entry to block sub passes through block dom. Block dom's frequency value therefore must be bigger or equal than the sum of the minimum values of the blocks it directly dominates. We can therefore propagate the minimum value of a block upward to its dominator.

Propagating range values in the postdominator tree works identically. Since different blocks are connected in the two trees we use them alternately. Since a successful propagation in one tree may enable additional propagations in the other we continue propagating until no more changes occur. This maximizes the potential propagation options.

Range Control Flow Graph Propagation

Propagating range values through the control flow graph is not as straightforward as propagating precise values. Precise values are final since we are able to precisely calculate them. Range values on the other hand remain changeable since changing one range value can enable us to make another range value more precise. During the range marking process we have to recalculate the range marking of both blocks and edges. A block's maximum value is at most as big as the sum of the maximum values of its outgoing edges. A block's minimum value is at least as big as the sum of the minimum values of its outgoing edges. In order to propagate a block's minimum value to an edge, the maximum values of the edge's siblings must be known, i.e, must not be '?'. If that is the case then the edges minimum value equals the block's minimum value minus the sum of the edge's siblings maximum values. During the precise marking process we only need to consider the value of either the incoming or the outgoing edges when marking a block. If either set of edges would provide a precise value we knew that this value was correct and marked the block accordingly. During the range marking process we always have to calculate the resulting value of both sets of edges. We then have to combine them in order to mark the block range as accurately as possible. The same principle applies when marking an edge.

During the precise marking process we marked an edge with a value derived from either its origin block or its target block. During the range marking process we have to calculate both values and combine them to a more accurate one. This covers the calculations required for range marking blocks and edges in the control flow graph. These calculations are required whenever an edge has siblings. If an edge has no siblings than the edge's marking can be directly propagated to the block and vice versa. We range mark the control flow graph by iterating over the graph's blocks, starting with the method entry block. We handle each block by first recalculating the block's range value. We then propagate the block's value downward in the graph, i.e., propagate the value to the block's outgoing edges. We therefore iterate over the outgoing edges of the current block and recalculate each edge's value. Every change in an edge's value in turn affects the value of the edge's target block. This means that we have to recalculate the target block's value recursively. The process is finished once every block has been handled. This ensures that every change is immediately propagated downward throughout the whole control flow graph. Later steps then further improve these values. The range marking process concludes construction of the frequency graph. The resulting frequency graph ideally gives exact information of branch likelihood. When existing counter data is insufficient to construct a precise frequency graph then range marking still provides a reasonable estimate of branch likelihood.

Referring now to FIG. 13 which demonstrates the concepts of precise and range frequency data propagation using trivial propagation rules by examples. FIG. 13a shows a precise propagation example and FIG. 13b describes range propagation.

The upper part of FIG. 13a shows a control flow graph with measured execution frequency data as input for the precise frequency propagation process. Frequency data is only available for the ingoing edge 1300 of block A 1310, the edge 1301 between block C 1315 and G 1322 and for the edge 1302 between block F 1321 and H 1324. Frequency data is unknown for all other edges and for all blocks of the control flow graph. The lower part of FIG. 13a shows the same control flow graph after the precise propagation process with all frequency data calculated by the propagation process. Known frequency values of a block or edge are denoted as a number in brackets next to the respective block or edge. Unknown frequency values are denoted by a question mark. The sequential steps performed by the propagation process are identified by a number.

In a first step 1331 the frequency of edge 1300 is propagated to its ingoing block A 1310 because block A has no other ingoing block, therefore its frequency is only determined by edge 1300. After step 1331, the frequency of block A is known and step 2) 1332 propagates this frequency to the only outgoing edge 1311 of block A. Step 3) 1333 propagates the frequency of edge 1311 to block B 1312 which also has only one incoming edge. Block B has two outgoing edges 1313 and 1314 and the propagation process cannot yet decide how the frequency of block B is distributed between its two outgoing edges.

The propagation process continues with step 4) 1334 which propagates the frequency of edge 1301 to block C 1315 as edge 1301 is the only outgoing edge of block C. Step 5) 1335 propagates the frequency of C to its only incoming edge 1313.

Afterwards, the propagation process continues with step 6) 1336 and 7) 1337 which propagate the frequency of edge 1302 to block H 1324 and F 1321 as those blocks have no other incoming or outgoing edge Step 7) further propagates the frequency of block F 1321 to edge 1318 as edge 1318 is the only incoming edge of block F. Following step 8) 1338 calculates the frequency of the edge 1314 between block B 1312 and D 1316. The frequency of block B is known (step 3) and the frequency of all other outgoing edges of block B is known (step 5). Therefore, the frequency of edge 1314 may be calculated as frequency of its outgoing block B minus the frequency of all other outgoing edges of block B. Step 9) 1339 propagates the frequency of edge 1314 to block D and step 10) 1340 calculates the frequency of edge 1317 as frequency of block D minus the frequency of edge 1318. Step 11) 1341 propagates from edge 1317 to block E 1319 and step 12) 1342 propagates the frequency of block E to its only outgoing edge 1320. Step 13) calculates the frequency of block G 1322 as sum of the frequencies of its incoming edged 1301 and 1320. After step 13), the frequency of all elements of the control flow graph are calculated and the process ends. It is noteworthy that the propagation process may also be terminated when no more trivial precise rule can be applied, even if there still exist blocks or nodes with unknown frequency.

Rule based frequency range propagation starts with a control flow graph that may contain in addition to edges and nodes with precise frequency data, elements with frequency ranges (as e.g. calculated by a prior dominance/post-dominance based frequency range calculation step). The upper part of FIG. 13b shows a control flow graph with nodes A 1360, G 1363 and E 1371 and edges 1350, 1351 and 1352 with precise frequency data, nodes B 1367, C 1362, D 1370 and F 1365 with range frequency data and edges 1361, 1364, 1366, 1368 and 1369 with unknown frequency range data (a range of [0,?] as 0 is the lower bound for the minimum frequency)

The lower part of FIG. 13b displays a sequence of range propagation steps applied to the control flow graph to improve the frequency data. Steps 1) 1381 and 2) 1382 propagate the frequency of block A 1360 to the maximum frequency of its outgoing edges 1366 and 1361, step 3) 1383 propagates the maximum frequency of block B 1367 to its outgoing edge 1369, step 4) 1384 propagates the maximum frequency of block C to its outgoing edge 1368 because the only other outgoing edge of block C has a known frequency of 0, therefore the maximum frequency of block C must be equal to the maximum frequency of edge 1368. Step 5) 1385 calculates the maximum frequency of the outgoing edge 1364 of block D 1370 as the maximum frequency of block D minus the minimum or precise frequency of all other outgoing edges of block D. Step 6) 1386 updates the maximum frequency of block F to the now known maximum frequency of its only incoming edge 1364. No further improvements are possible after step 6 and the frequency range propagation process terminates.

FIG. 14 describes the steps of the precise dominance/post-dominance based frequency propagation by an example. The first step 1430 consists in the receiving of a control flow graph of a method with measured and calculated precise frequency data. In the described example, the control flow graph starts with an incoming edge 1400 to a block A 1401, both with known frequency, afterwards the graph branches to blocks B 1402 and C 1403. The graph joins in block D 1404 with unknown frequency after block B or C and after block D 1404 branches to blocks E 1406 with known frequency and block F 1407 with unknown frequency. The method is exited after block E or F.

Step 1431 calculates the dominance trees in execution order 1410 and in reverse execution order 1420 (post-dominance tree) for the control flow graph.

As explained earlier, a given block is dominated by another block if the given block can only be reached via the other block. As every execution of the method starts with the entry to the method, the dominator tree 1410 starts with a virtual <entry>block 1411. As block A 1401 is always executed as first block of the method, only block A is directly dominated by the entry block. Blocks B 1402 and C 1403 are dominated by A as each execution of B or C first executed A. Block D may be reached via B or C, so neither B or C dominate D, but each execution of D first executes A, therefore A also dominates D. Blocks E 1406 and F 1407 are always executed after block D, therefore D dominates those blocks.

The dominance tree in reverse execution order or post-dominance tree 1420 starts with a virtual <exit>block 1421. As blocks E 1406 or F 1407 are executed directly before each method exit, E and F are post-dominated by the exit block. Block D 1404 may be reached from the method exit in reverse order either via block E or block F. Therefore, neither E nor F post-dominate D, only the exit block 1421. Blocks B and C are only reachable from the exit block via block D, therefore D post-dominates blocks B and C. Block A can only be reached from the exit block via block D, therefore A is post-dominated by block D.

After both dominator tree variants are calculated the propagation process continues to step 1432, which identifies pairs of blocks that are both a dominance relationship (e.g. A→B, A→D, A→C or D→F) and in a post-dominance relationship (e.g. D→B, D→A or D→C). The only blocks in the example that are both in a dominance 1412 and a post-dominance 1422 relationship are the blocks A and D.

The domination of block B by block A implies that each execution that enters the method and passes block B also passed block A. The post-domination of block A by block B implies that each execution that passes block A also passes block B before the method is exited.

In combination, this implies that an execution of the method either contains both block A and B or none of them, which further implies that the execution frequency of both blocks is the same. Step 1432 further uses the identified combined dominance/post-dominance relationships to propagate frequency values. In the described example, the frequency of block A 1401 is propagated to block D 1404. After all identified dominance/post-dominance relationships are processed and corresponding frequency propagation is finished, a next rule based propagation round 1433 is started which uses trivial propagation rules on the new calculated frequency data.

Coming now to FIGS. 15A and 15B which illustrates dominance/post-dominance relationship based frequency range propagation by an example. The propagation starts with two steps 1540 and 1541 that receive a control flow graph and create the two dominance tree variants as described in FIG. 14. The subsequent propagation step 1542 is subdivided into four sub steps that alternatingly and iteratively use dominance and post-dominance relationships to propagate minimum and maximum frequency values until no further improvements of the frequency data are possible. The propagation step 1542 may be terminated when a full sequence of all four sub steps creates no frequency data update or if the number of iterations of the four steps exceeds a certain threshold.

Sub step 1530 propagates maximum frequency values from dominating blocks to the blocks they are dominating. In the concrete example, the maximum value of block A 1501 is propagated to block D 1505, B 1502 and C 1503. As all executions passing a dominated block also pass the dominating block, the maximum execution count of the dominated block cannot be larger than the maximum execution count of the dominating block.

The maximum frequency value of block D is further propagated to the blocks it dominates. Those blocks are E 1508 and F 1509. Block E already has a precise frequency value. Therefore, the maximum frequency value of D is not propagated to block E, only to block F. Block G also already has a precise frequency value and the maximum frequency value of its dominating block is not propagated.

After all maximum frequency values are propagated down the dominance tree, sub step 1531 is executed which propagates minimum frequency from dominated blocks up to their dominating blocks. All executions of a dominated blocks also pass the dominating block. Therefore, the minimum execution count of a dominating block is at least as high as the sum of the minimum execution counts of the blocks it dominates. In the example, block D 1505 dominates block E and F where, block E has a precise frequency of 10 which can also be interpreted as a frequency range with a minimum value equal to the maximum value and F has a minimum value of 0. The sum of the minimum values of E and F is 10 which is propagated to the minimum value of block D.

Following sub step 1532 uses the post-dominance tree to propagate maximum frequency values. Maximum frequency values are propagated from the top to the bottom of the tree, in the example the maximum value of block D 1505 would be propagated to block B 1502. The maximum value of B is already equal to the maximum value of block D. Therefore, the maximum value of block B is not changed.

Sub step 1533 propagates minimum frequency values up from the bottom of the post-dominance tree. In the example, the minimum value of block B 1502 would be propagated to block D 1505 but D already has a minimum value that is higher than the minimum value of block B. Consequently, the minimum value of block D is not changed.

After the iterative dominance tree based range propagation step 1542 is finished a final step 1543 provides the control flow graph with the improved frequency data for the next processing step.

Referring now to FIG. 16 which describes processes that may be used to correct allocation counter values in case of unexpected execution terminations like exceptions. An exception may terminate a monitored method at an arbitrary point. Allocation counters as described herein are corresponding to a path and count all allocations performed by the path. Those counters may create incorrect values when a path is terminated earlier than expected.

FIG. 16a describes the flowchart of a process that improves the instrumentation of a method to detect exceptions that occur during method execution that cause an unexpected termination of the method. The process starts with step 1600 when the instrumentation of allocation counters as described earlier is finished.

Subsequent step 1601 adapts the method in a way that uncaught exceptions that occur during the method execution are redirected to code that handles the exception. Typically, this is performed by surrounding the code of the method with a try/catch block where the catch portion is configured to catch all exceptions. Basically, try/catch block consists in a "try" statement that delimits the start of a code portion that is observed for occurring exceptions and a "catch" statement that delimits the end of the observed code portion. In addition, the "catch" statement defines the exceptions that are covered by the try/catch block and contains code that handles those exceptions.

Following step 1602 creates exception handling code for the previously created catch block that executes an exception correction sensor (for details see FIG. 16b) and then rethrows the caught exception. A try/catch block "consumes" the exceptions that occurred within the try/catch block, therefore exceptions caught by the instrumented try/catch block need to be rethrown to not change the behavior of the application. A call to the exception correction sensor may also be injected into already existing exception handling code of the method.

The process then ends with step 1603.

Some alternative embodiments may only add exception correction code to already existing exception handling code like existing try/catch blocks or thread global handlers for uncaught exceptions. Such embodiments may be more efficient as adding exception handlers may introduce adverse effects to the performance of the monitored code as e.g. adding exception handlers to a method disables some optimization features of the Java® JIT compiler. However, the generated exception monitoring data is less suitable for the correction of allocation counter data because exceptions may only be detected after already multiple monitored methods were terminated and corresponding allocation data correction may be more complicated as it may have to consider multiple methods.

Coming now to FIG. 16b which describes the execution of an exception correction sensor. The process starts with step 1610, e.g. when an exception that unexpectedly terminated a method execution occurred, and the execution correction sensor which is injected into code that handles the occurred exception is executed.

Subsequent step 1611 gathers data describing the occurred exception, e.g. in form of call stack data. The call stack data describes the method in which the exception occurred together with data describing the position within the method at which the exception occurred (e.g. a line number or bytecode index). Code before the reported position of the exception was executed, code after this position was skipped due to the exception.

Following step 1612 determines the path affected by the exception and whether the counter of the affected path was executed. This may be performed by first determining the currently executed path, e.g. by identifying the block 501 in which the exception occurred and in turn identify the path 520 to which the identified block belongs and the position of the counter of this path. The position of the counter together with the position of the exception may be used to determine if the exception occurred before the counter execution and the counter increment was skipped or the exception occurred after the counter execution and the counter increment was executed.

Following decision step 1613 continues with step 1614 in case the counter was not executed and with step 1615 otherwise.

If the counter of the affected path was not executed, then allocations between the branch point of the affected path and the position of the exception were performed but not counted. Step 1614 identifies those allocations and adapts counter values to also represent those allocations missed due to the exception.

In case the counter of the affected path was executed, then allocations after the exception, including both allocations performed by the affected path after the exception and all allocations of the join correction of the affected path were counted but not performed. Step 1615 identifies counted but not performed allocations as those allocations of the affected path that are situated after the position of the exception and before the join point of the affected path plus the join correction of the affected path. Afterwards, counter values are adapted to not represent the previously counted but not performed allocations. After step 1614 or 1615 the process ends with step 1616.

In variant embodiments in which an exception correction sensor and a corresponding try/catch block is placed at every monitored method, process 16b may be performed by each placed exception correction sensor for the method to which it is deployed. In alternative variants in which exception correction sensors are only placed in already existing try/catch blocks, an exception correction sensor may perform process 16b for the method to which is deployed and may in addition use call stack data to identify other nested methods that were also terminated by the exception and perform process 16b also for those other methods.

Some variant embodiments may further improve the ratio between increments and allocations through hot path counter inlining. In Java bytecode calls to constructors, static methods, and private methods are statically bound. This means that we can identify the method targeted by these calls. We then inline these method's hotpath counter by calculating the hot path's counter semantics without instrumenting the hot path counter. Whenever we find a call to such an inlined method in a path of another method, we add the inlined hot path counter's semantics to the semantics of the calling path's counter. This eliminates one increment without sacrificing precision.

Some other variant embodiments may combine the generated allocation data with method call stack monitoring data. project. This approach may sample method call stack traces and allocation data at set intervals. For every sample it then maps allocations to call stacks. This extends our tracked allocation sites by adding the caller chain leading to the allocating method of each the allocation site.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD- ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for monitoring memory allocation during execution of an application in a distributed computing environment, comprising:
    identifying execution paths in an application using a control flow graph, where each node in the control flow graph belongs to only one identified execution path and the application resides on a computing device;
    for each identified execution path in the application, determining memory allocations which occur during execution of a given execution path;
    for each identified execution path in the application, determining only one location for an allocation counter in the given execution path, where the allocation counter in the given execution path increments in response to execution of the given execution path;
    for each identified execution path in the application, instrumenting the given execution path with the allocation counter at the location, where the allocation counter is placed at the location in the given execution path and the allocation counter reports a count value for the allocation counter; and
    determining, for the given execution path, semantics of the increment of the allocation counter of the given execution path as sum of memory allocation performed by the given execution path and corrections for memory allocations reported by another allocation counter in another execution path different than the given execution path.

2. The method of claim 1 wherein location for the allocation counter in the given execution path is an edge in the control flow graph along the given execution path that is least shared amongst the identified execution paths.

3. The method of claim 1 further comprises
    intercepting, by an agent, bytecode for the application while the application is being loaded, where the agent resides on the computing device; and
    extracting, by the agent, the control flow graph from the bytecode before the step of identifying execution paths in the application.

4. The method of claim 3 further comprises
    receiving, by the agent, the count value reported by the allocation counter;
    formulating, by the agent, memory allocation data for the given execution path, where the memory allocation data includes the count value reported by the allocation counter; and
    sending, by the agent, the memory allocation data to a monitoring server located remotely from the first computing device.

5. The method of claim 4 further comprises
    monitoring, by a sensor instrumented in the application, execution of a transaction which performed the memory allocations;
    sending, by the sensor, transaction data to the monitoring server, where the transaction data includes an identifier for the transaction; and
    correlating, by the monitoring server, the transaction data with the memory allocation data, wherein the memory allocation data includes at least one of the identifier for the transaction or an identifier for a thread which executed the application.

6. The method of claim 4 wherein the memory allocation data formulated by the agent includes an identifier for the allocation counter, location of the allocation counter in the given execution path, the count value for the allocation counter, and semantics of a counter increment in form of allocations represented by one counter increment.

7. The method of claim 1 wherein corrections for quantities of memory allocations are further defined as
    subtracting memory allocations from sum of memory allocation performed in a predecessor execution path that precedes the given execution path when the given execution path branches from the predecessor execution path after the allocation counter in the predecessor execution path, where the memory allocation subtracted from the sum are the memory allocations situated after the given execution path branches from the predecessor execution path;
    adding memory allocations to sum of memory allocation performed in a predecessor execution path that precedes the given execution path when the given execution path branches from the predecessor execution path before the allocation counter in the predecessor execution path, where the memory allocation added to the sum are the memory allocations situated before the given execution path branches from the predecessor execution path;
    subtracting memory allocations from sum of memory allocation performed in a joined execution path that follows the given execution path when the given execution path joins the joined execution path before the allocation counter in the joined execution path, where the memory allocation subtracted from the sum are the memory allocations situated before the given execution path joins the joined execution path; and
    adding memory allocations to sum of memory allocation performed in the joined execution path that follows the given execution path when the given execution path joins from the joined execution path after the allocation counter in the joined execution path, where the memory allocation added to the sum are the memory allocations situated after the given execution path joins the joined execution path.

8. The method of claim 1 wherein determining a location for an allocation counter includes
counting, for each edge in the given execution path, a number of other paths that join the given execution path before the edge;
counting, for each edge in the given execution path, the number of other paths that branch from the given execution path after the edge;
summing, for each edge in the given execution path, the counts; and
selecting the edge in the given execution path having the lowest sum as the location for the allocation counter.

9. The method of claim 8 further comprises
identifying edges in the given execution path that are connected to at least one node in the control flow graph that performs a memory allocation; and
selecting the edge in the given execution path having the lowest sum and identified as being connected to at least one node in the control flow graph that performs a memory allocation.

10. The method of claim 1 wherein identifying execution paths in an application includes
determining a main execution path by starting at an entry point and traversing the control flow graph until an exit point is reached, where the main execution path is most likely path executed in the application;
determining one or more secondary execution paths for the application by starting at a branch point along the main execution path and traversing the control flow graph until joining an identified execution path or an exit point is reached;
determining additional secondary execution paths for the application by starting at a branch point along one of the secondary execution paths and traversing the control flow graph until joining an identified execution path or an exit point is reached; and
repeating the determining of additional secondary execution paths for all of the branch points along the secondary execution paths.

11. The method of claim 10 wherein traversing the control flow graph further comprises recording frequency at which the identified execution paths are being executed during execution of the application and, upon reaching a branch point along the control flow graph, selecting a branch exiting the branch point having largest execution frequency.

12. The method of claim 1 wherein identifying execution paths in an application includes
recording frequency at which the identified execution paths are being executed during execution of the application;
identifying execution paths in the application using a static rule set when the recorded frequency is less than a threshold; and
identifying execution paths in the application using the recorded frequency when the recorded frequency is above the threshold.

13. The method of claim 1 further comprises
detecting unexpected execution termination along the given execution path before execution of the given execution path is completed;
identifying the given execution path affected by the termination;
determining whether the allocation counter in the given execution path was executed before the termination;
identifying memory allocations performed in the given execution path after the termination and adjusting quantities of memory allocations reported by the agent by subtracting counts of memory allocations that were not performed when the allocation counter in the given execution path was executed before the termination; and
identifying memory allocations performed in the given execution path before the termination and adjusting quantities of memory allocations reported by the agent by adding counts of memory allocations that were performed when the allocation counter in the given execution path was not executed before the termination.

14. The method of claim 1 further comprises
collecting count values from the allocation counters instrumented in the first set of execution paths;
identifying a second set of execution paths in the application using the count values collected from the allocation counters instrumented in the first set of execution paths, where the second set of execution paths includes one or more execution paths that differ from the execution paths in the first set of execution paths;
for each identified execution path in the second set of execution paths, determining a location for an allocation counter in an identified execution path, where the location for the allocation counter in the identified execution path is an edge in the control flow graph along the identified execution path that is least shared amongst the identified execution paths; and
for each identified execution path in the second set of execution paths, re-instrumenting the identified execution path with only one allocation counter.

15. A computer-implemented method for monitoring memory allocation during execution of an application in a distributed computing environment, comprising:
identifying a first set of execution paths in an application using a control flow graph, where each node in the control flow graph belongs to only one identified execution path and the application resides on a computing device;
for each identified execution path in the first set of execution paths, instrumenting a given execution path with an allocation counter, where the allocation counter in the given execution path increments in response to execution of the given execution path and the allocation counter reports a count value of the allocation counter;
collecting count values from the allocation counters instrumented in the first set of execution paths;
identifying a second set of execution paths in the application using the count values collected from the allocation counters instrumented in the first set of execution paths, where the second set of execution paths includes one or more execution paths that differ from the execution paths in the first set of execution paths;
for each identified execution path in the second set of execution paths, determining a location for a second allocation counter in an identified execution path in the second set of execution paths, where the location for the second allocation counter in the identified execution path is an edge in the control flow graph along the identified execution path that is least shared amongst the identified execution paths; and for each identified execution path in the second set of execution paths, re-instrumenting the identified execution path with only one allocation counter.

16. The method of claim 15 wherein location for the allocation counter in the given execution path is an edge in the control flow graph along the given execution path that is least shared amongst the identified execution paths.

17. The method of claim 15 further comprises
receiving, by an agent, the count value reported by the allocation counter, where the agent resides on the computing device;
formulating, by the agent, memory allocation data for the given execution path, where the memory allocation data includes the count value reported by the allocation counter; and
sending, by the agent, the memory allocation data to a monitoring server located remotely from the first computing device.

18. The method of claim 17 further comprises
monitoring, by a sensor instrumented in the application, execution of a transaction which performed the memory allocations;
sending, by the sensor, transaction data to the monitoring server, where the transaction data includes an identifier for the transaction; and
correlating, by the monitoring server, the transaction data with the memory allocation data, wherein the memory allocation data includes at least one of the identifier for the transaction or an identifier for a thread which executed the application.

19. The method of claim 18 wherein the memory allocation data formulated by the agent includes an identifier for the allocation counter, location of the allocation counter in the given execution path, the count value for the allocation counter, and semantics of a counter increment in form of allocations represented by one counter increment.

20. The method of claim 15 further comprises identifying a second set of execution paths in the application only when the count values exceed a threshold.

21. The method of claim 15 further comprises, prior to the step of identifying a second set of execution paths, propagating count values to nodes and edges in the control flow graph with unknown count values using a propagation rule set.

22. The method of claim 15 further comprises
recursively propagating count values to nodes and edges in the control flow graph with unknown count values using a propagation rule set;
identifying one or more nodes or edges in the control flow graph with unknown count values;
recursively propagating count values to nodes and edges in the control flow graph with unknown count values using dominance relationships between nodes and post dominance relationships between nodes when one or more nodes or edges in the control flow graph are identified with unknown count values;
determining whether new count values were propagated using dominance relationships and post dominance relationships and repeating the steps of recursively propagating count values when new count values were propagated using dominance relationships and post dominance relationships.

23. The method of claim 22 further comprises
recursively propagating ranges for count values to nodes and edges in the control flow graph with unknown count values using dominance relationships between nodes and post dominance relationships between nodes;
identifying one or more nodes or edges in the control flow graph with unknown count values; and
recursively propagating ranges for count values to nodes and edges in the control flow graph with unknown count values using the propagation rule set.

24. The method of claim 22 wherein propagating count values to nodes and edges in the control flow graph using dominance relationships between nodes and post dominance relationships between nodes further comprises
generating a dominance tree from the control flow graph;
generating a post dominance tree from the control graph;
identifying pairs of nodes that are in both a dominance relationship and a post dominance relationship; and
propagating the count values between the identified pair of nodes.

25. A computer-implemented system for monitoring memory allocation during execution of an application in a distributed computing environment, comprising:
an agent instrumented on a host computing device, where the application resides on the host computing device and is executed by a processor of the host computing device, where the agent includes:
a control flow extractor configured to receive bytecode for the application and construct a control flow graph for the application from the bytecode;
a path builder configured to identify execution paths in the application such that each node in the control flow graph belongs to only one identified execution path;
a counter positioner configured to receive the identified execution paths from the path builder and, for each identified execution path, determines a location for an allocation counter in a given execution path; and
instrumentor configured to receive the determined locations of the allocation counters and, for each identified execution path, instruments the given execution path with an allocation counter at the determined location for the given execution path, where the allocation counter increments in response to execution of the given execution path and reports a count value for the allocation counter;
wherein the agent further includes a counter semantic calculator that determines semantics of the increment of the allocation counter of the given execution path as sum of memory allocation performed by the given execution path and corrections for memory allocations reported by another allocation counter in an execution path different than the given execution path.

26. The system of claim 25 wherein counter positioner determines a location for the allocation counter in the given execution path that is an edge in the control flow graph along the given execution path that is least shared amongst the identified execution paths.

27. The system of claim 25 wherein counter positioner determines a location for the allocation counter in the given execution path by counting, for each edge in the given execution path, a number of other paths that join the given execution path before the edge; counting, for each edge in the given execution path, the number of other paths that branch from the given execution path after the edge; summing, for each edge in the given execution path, the counts; and selecting the edge in the given execution path having the lowest sum as the location for the allocation counter.

28. The system of claim 25 wherein the counter semantics calculator corrects for memory allocations by
- subtracting memory allocations from sum of memory allocation performed in a predecessor execution path that precedes the given execution path when the given execution path branches from the predecessor execution path after the allocation counter in the predecessor execution path, where the memory allocation subtracted from the sum are the memory allocations situated after the given execution path branches from the predecessor execution path;
- adding memory allocations to sum of memory allocation performed in a predecessor execution path that precedes the given execution path when the given execution path branches from the predecessor execution path before the allocation counter in the predecessor execution path, where the memory allocation added to the sum are the memory allocations situated before the given execution path branches from the predecessor execution path;
- subtracting memory allocations from sum of memory allocation performed in a joined execution path that follows the given execution path when the given execution path joins the joined execution path before the allocation counter in the joined execution path, where the memory allocation subtracted from the sum are the memory allocations situated before the given execution path joins the joined execution path; and
- adding memory allocations to sum of memory allocation performed in the joined execution path that follows the given execution path when the given execution path joins from the joined execution path after the allocation counter in the joined execution path, where the memory allocation added to the sum are the memory allocations situated after the given execution path joins the joined execution path.

29. The system of claim 25 wherein the agent receives the count value reported by the allocation counter and stores the count value in a counter repository.

30. The system of claim 29 further comprises a monitoring server located remotely across a network from the host computing device, wherein the agent periodically retrieves the count value from the counter repository, formulates memory allocation data for the given execution path and send the memory allocation data to the monitoring server, where the memory allocation data includes the count value.

31. The system of claim 30 further comprises a sensor instrumented in the application, wherein the sensor monitors execution of a transaction which performs memory allocations and sends transaction data over the network to the monitoring node, where the transaction data include at least one of an identifier for the transaction or an identifier for a thread which executed the application.

* * * * *